(12) United States Patent
Dua et al.

(10) Patent No.: US 11,625,929 B2
(45) Date of Patent: Apr. 11, 2023

(54) SELECTION OF OBJECT RECOGNITION MODELS FOR COMPUTER VISION

(71) Applicant: salesforce.com, inc., San Francisco, CA (US)

(72) Inventors: Rajdeep Dua, Hyderabad (IN); Mani Kandar Madduri, Hyderabad (IN); Nutana Sukumar Reddy Muramreddy, Hyderabad (IN); Piyush Singh, Hyderabad (IN)

(73) Assignee: salesforce.com, inc., San Francisco, CA (US)

( * ) Notice: Subject to any disclaimer, the term of this patent is extended or adjusted under 35 U.S.C. 154(b) by 163 days.

(21) Appl. No.: 16/884,233

(22) Filed: May 27, 2020

(65) Prior Publication Data

US 2021/0240967 A1  Aug. 5, 2021

(30) Foreign Application Priority Data

Jan. 31, 2020  (IN) .............................. 202041004435

(51) Int. Cl.
*G06V 20/64* (2022.01)
*G06T 7/00* (2017.01)
*G06V 10/44* (2022.01)

(52) U.S. Cl.
CPC ............ *G06V 20/64* (2022.01); *G06T 7/0014* (2013.01); *G06V 10/446* (2022.01)

(58) Field of Classification Search
CPC .... G06V 20/64; G06V 10/446; G06T 7/0014; G06K 9/6288; G06K 9/628

USPC .......................................................... 382/154
See application file for complete search history.

(56) References Cited

U.S. PATENT DOCUMENTS

2015/0235474 A1 * 8/2015 Mullins .................... G06T 7/70
345/419

FOREIGN PATENT DOCUMENTS

CN  102652319 A  *  8/2012  ......... G06K 9/00201

* cited by examiner

*Primary Examiner* — Ayodeji O Ayotunde
(74) *Attorney, Agent, or Firm* — Sterne, Kessler, Goldstein & Fox P.L.L.C.

(57) ABSTRACT

Disclosed herein are system, method, and computer program product embodiments for compliance auditing using cloud based computer vision. In one aspect, a system is configured to receive, from a mobile device, a compliance audit request to at least recognize one or more products within the audit image. The system is further configured to select a first object recognition model having a first associated object recognition model identifier from a model selection list based at least on a required object recognition list, wherein the first object recognition model is configured to recognize a first set of object names within the required object recognition list. The system is further configured to request the computer vision system to perform object recognition using the first object recognition model to recognize the first set of object names within the audit image, and transmit audit result information to the mobile device.

20 Claims, 20 Drawing Sheets

| Object Recognition Model List 410 | |
|---|---|
| Model Identifier | Recognized Object Names |
| Model Identifier 412-1 | Object Name 420-1, Object Name 420-2, Object Name 420-3 |
| Model Identifier 412-2 | Object Name 420-2, Object Name 420-4, Object Name 420-5 |
| Model Identifier 412-3 | Object Name 420-6, Object Name 420-5 |
| Model Identifier 412-4 | Object Name 420-7 |
| ... | ... |
| Model Identifier 412-a | Object Name 420-b |

Required Object Recognition List 510

Object Names 420-2, 420-4, and 420-6

500

512

| Iteration | Model Id. 412-1 | Model Id. 412-2 | Model Id. 412-3 | Aggregate Recognized Object Names |
|---|---|---|---|---|
| 1 | use | ignore | ignore | Object Name 420-1, Object Name 420-2, Object Name 420-3 |
| 2 | ignore | use | ignore | Object Name 420-2, Object Name 420-4, Object Name 420-5 |
| 3 | ignore | ignore | use | Object Name 420-6, Object Name 420-5 |
| 4 | use | use | ignore | Object Name 420-1, Object Name 420-2, Object Name 420-3, Object Name 420-4, Object Name 420-5 |
| 5 | use | ignore | use | Object Name 420-1, Object Name 420-2, Object Name 420-3, Object Name 420-6, Object Name 420-5 |
| 6 | ignore | use | use | Object 420-2, Object 420-4, Object 420-5, Object 420-6, Object 420-5 |
| 7 | use | use | use | Object Name 420-1, Object Name 420-2, Object Name 420-3, Object Name 420-4, Object Name 420-5, Object name 420-6 |

FIG. 5

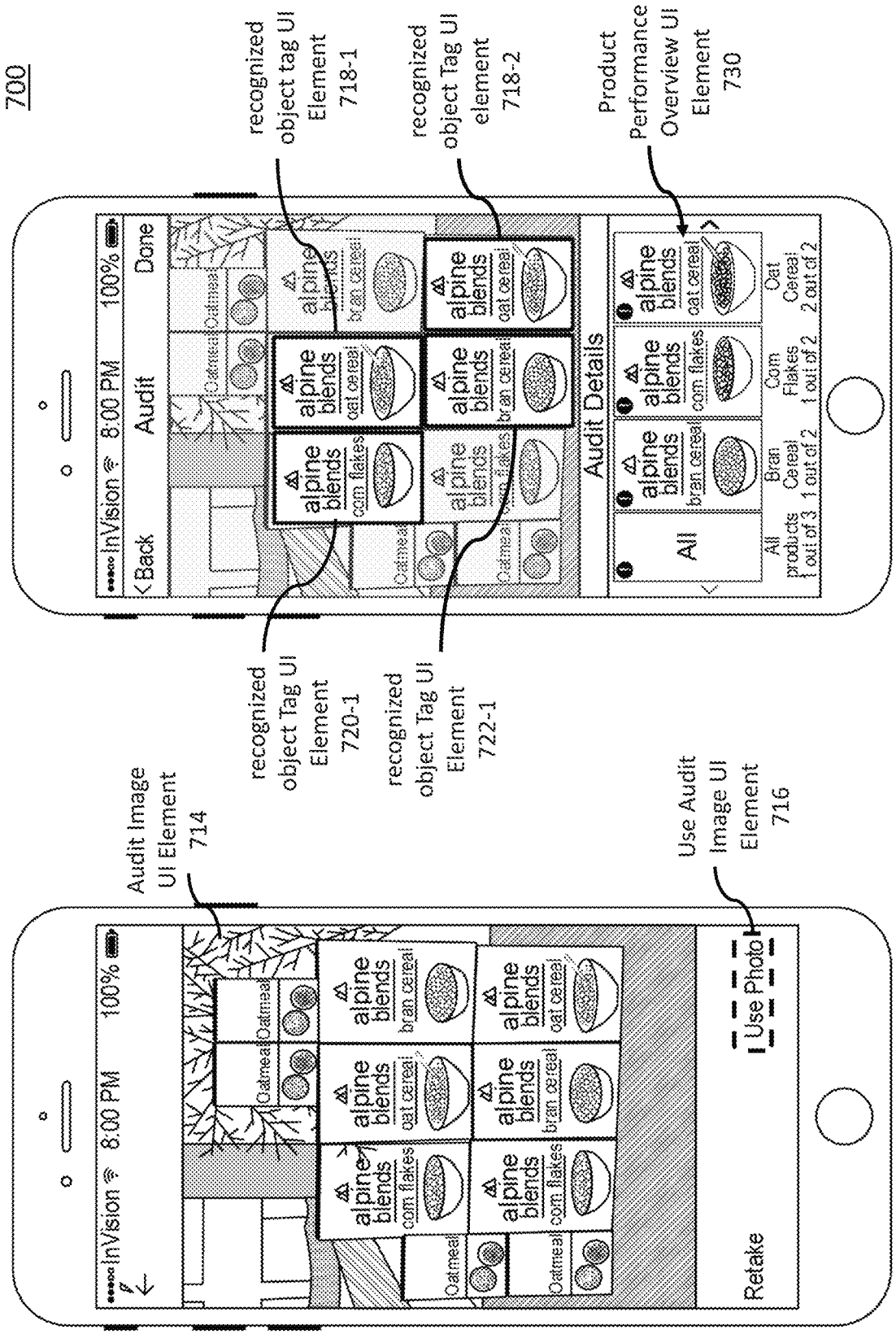

SELECTION OF OBJECT RECOGNITION MODELS FOR COMPUTER VISION

CROSS REFERENCE TO RELATED APPLICATION

This application claims the benefit of priority to Indian Provisional Patent Application No. 202041004435 filed on Jan. 31, 2020 in the Indian Patent Office, which is incorporated herein by reference in its entirety.

BACKGROUND

The field of computer vision has gained a lot of attraction in recent years. One aspect of computer vision is object recognition, which may include, without limitation, concepts such as image classification, object localization, object detection, and object segmentation. Object detection is typically referred to as a set of machine learning algorithms that locate (e.g., identifying a region around the object, etc.) and identify objects (e.g., persons, vehicles, retail products, etc.) within a digital image and/or a digital video. Typically, to locate and identify objects within a digital image and/or a digital video, labeled datasets (e.g., images with bounding boxes and associated labels, etc.) are used to train a machine learning algorithm to generate an object recognition model. The trained object recognition model may then be used to locate and identify objects within a digital image and/or a digital video. In some instances, multiple object recognition models may be trained to locate and identify various objects within a digital image and/or a digital video, where each object recognition model may only recognize a limited set of objects within the digital image and/or the digital video. In those instances, an efficient system and method is needed to determine a minimum set of object recognition models that may be used to locate and identify the various objects within a digital image and/or a digital video.

BRIEF DESCRIPTION OF THE DRAWINGS

The accompanying drawings are incorporated herein and form a part of the specification.

FIG. 4 illustrates an example embodiment of an object recognition model list used in the selection of object recognition models for computer vision.

FIG. 5 illustrates an example embodiment of a first method for selecting and applying a minimum set of object recognition models for computer vision.

FIGS. 7A-7D illustrate example UI views of the mobile compliance application for performing an example compliance audit in the example retail store that uses a minimum set of object recognition models to locate and identify one or more products in an audit image.

Figure 1:
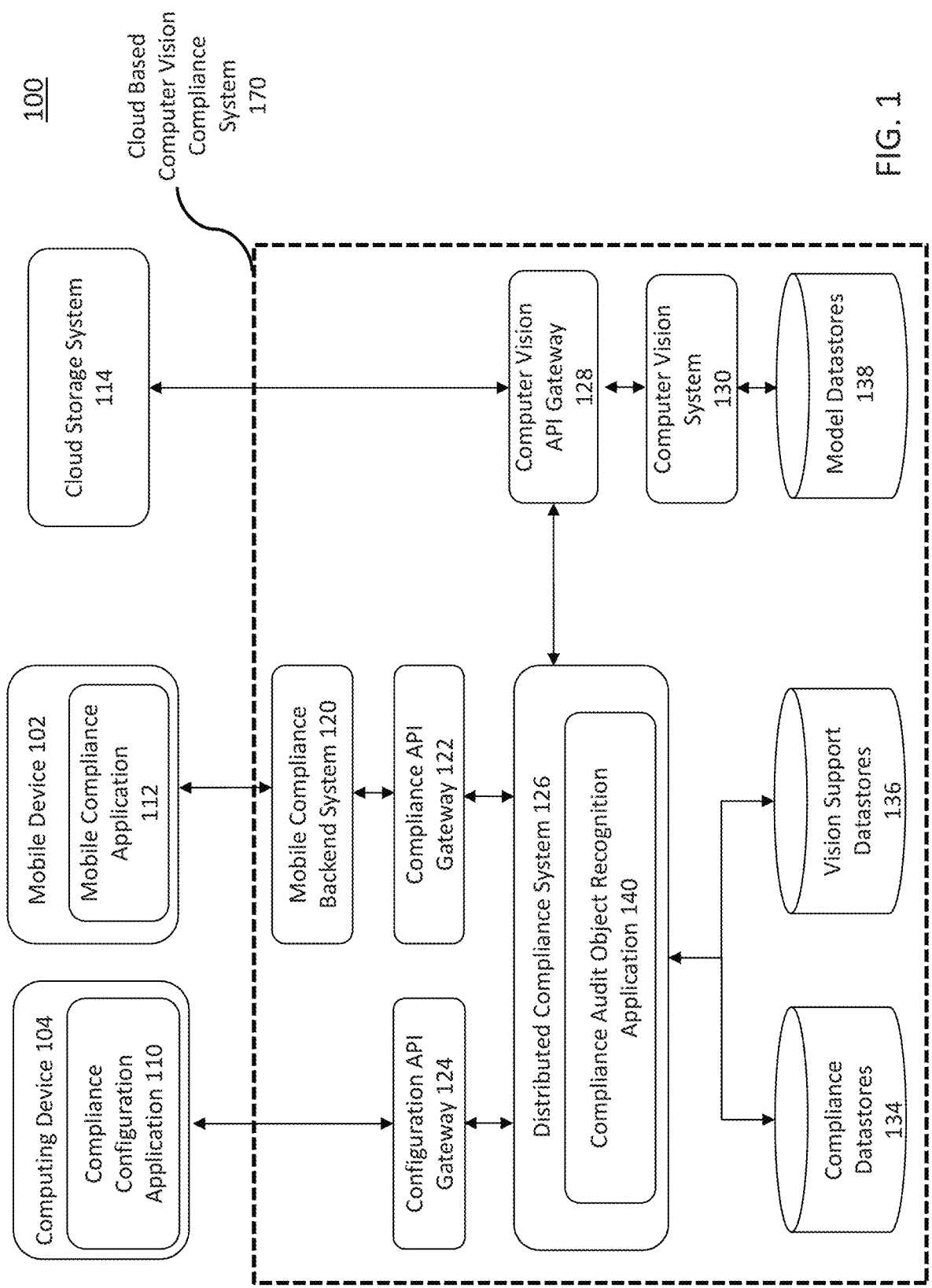
FIG. 1 illustrates an example embodiment of a system for efficient selection of object recognition models for computer vision in the context of a mobile compliance auditing system.

In the drawings, like reference numbers generally indicate identical or similar elements. Additionally, generally, the left-most digit(s) of a reference number identifies the drawing in which the reference number first appears. Furthermore, one or more designators to the right of a reference number such as, for example, "a" and "b" and "c" and other similar designators are intended to be variables representing any positive integer. Thus, for example, if an implementation sets a value for a=4, then a set of elements 104-*a* may include elements 114-1, 114-2, 114-3, and 114-4.

DETAILED DESCRIPTION

Provided herein are system, apparatus, article of manufacture, method and/or computer program product embodiments, and/or combinations and sub-combinations thereof, for efficient selection of object recognition models for computer vision.

Moreover, to provide a quick and efficient way of determining a minimum set of object recognition models that may be used to recognize (e.g., detect, classify, locate, identify, etc.) objects within a digital image and/or a digital video, various embodiments are disclosed that describe at least one method that may be performed by a cloud based object recognition services. To further illustrate how a cloud based object recognition services may efficiently determine a minimum set of object recognition models that are used to recognize one or more objects, various example embodiments are also disclosed in the context of a mobile compliance auditing system that leverage cloud based object recognition capabilities.

For example, by leveraging cloud based object recognition capabilities, one or more users (e.g., compliance auditors, sales representatives) may use his or her mobile device to first capture an audit image of a marketing campaign (e.g., one or more planograms) that is on display at a physical location (e.g., a physical store). After the audit image is captured, the mobile device may then transmit the audit image to a cloud based computer vision compliance system. The cloud based computer vision compliance system may then perform object recognition using a minimum set of object recognition models in order to ensure that the on display marketing campaign as captured in the audit image complies with a product manufacturer's marketing campaign as originally designed.

Further features and advantages, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

FIG. 1 illustrates an example block diagram according to an example embodiment of a mobile compliance auditing system 100 using one or more computer vision services. The one or more computer vision services may also be configured to efficiently select a minimum set of object recognition models for use in object recognition. In one embodiment, the mobile compliance auditing system 100 may include, without limitation, computing device 104, mobile device 102, and cloud storage system 114. Although not explicitly illustrated, it is to be appreciated that these devices and system may be operatively coupled via the Internet and/or one or more intranets. Additionally, the computing device 104, the mobile device 102, and the cloud storage system 114, may also be operatively coupled to the cloud based computer vision compliance system 170 via the Internet and/or one or more intranets to facilitate the training, testing, validation, and experimentation of the computer vision system 130 and mobile compliance auditing.

In one embodiment, the cloud based computer vision system 170 may include configuration application program interface (API) gateway 124, which may be further operatively coupled to the distributed compliance system 126. In one embodiment, the distributed compliance system 126 may be operatively coupled to the compliance datastores 134 and vision datastores 136. Additionally, the cloud based computer vision system 170 include a mobile compliance backend system 120, which may be operatively coupled to the compliance API gateway 122 and further operatively coupled to the distributed compliance system 126. The distributed compliance system 126 may be operatively coupled to the computer vision API gateway 128, which is operatively coupled to the computer vision system 130 and the cloud storage system 114. The computer vision system 130 may be further operatively coupled to the model datastores 138. It is to be appreciated that all the gateways, systems, and/or datastores within the cloud based computer vision system 170 may be operatively coupled via the Internet and/or one or more intranets to allow one or more users to perform compliance auditing using cloud based computer vision services.

In one embodiment, the computing device 104 may be representative of a product manufacturer's (e.g., consumer goods manufacturer, durable goods manufacturer, etc.) computing device 104 that is configured to execute a compliance configuration application 110. In one embodiment, the compliance configuration application 110 may be configured as a web based application or a native application executing on the computing device 104.

In one embodiment, the compliance configuration application 110 may be configured to allow a user associated with a product manufacturer to provide or otherwise generate experimentation, testing, training, and validation datasets that are used to train/retrain, test, and/or validate the computer vision system 130 via the computer vision API gateway 128. In one embodiment, the compliance configuration application 110 may also be configured to allow a user associated with a product manufacturer to provide compliance audit information which may include information relating to one or more visual marketing campaigns (e.g., one or more planograms) at one or more physical locations (e.g., stores).

In one embodiment, the configuration API gateway 124 may provide one or more APIs to allow one or more applications (e.g., the compliance configuration application 110, etc.) to communicate with the distributed compliance system 126. For example, the configuration API gateway 124 may be configured to manage any incoming requests and provide corresponding responses between the one or more applications and the distributed compliance system 126 in accordance with a specified communication protocol.

Figure 2:
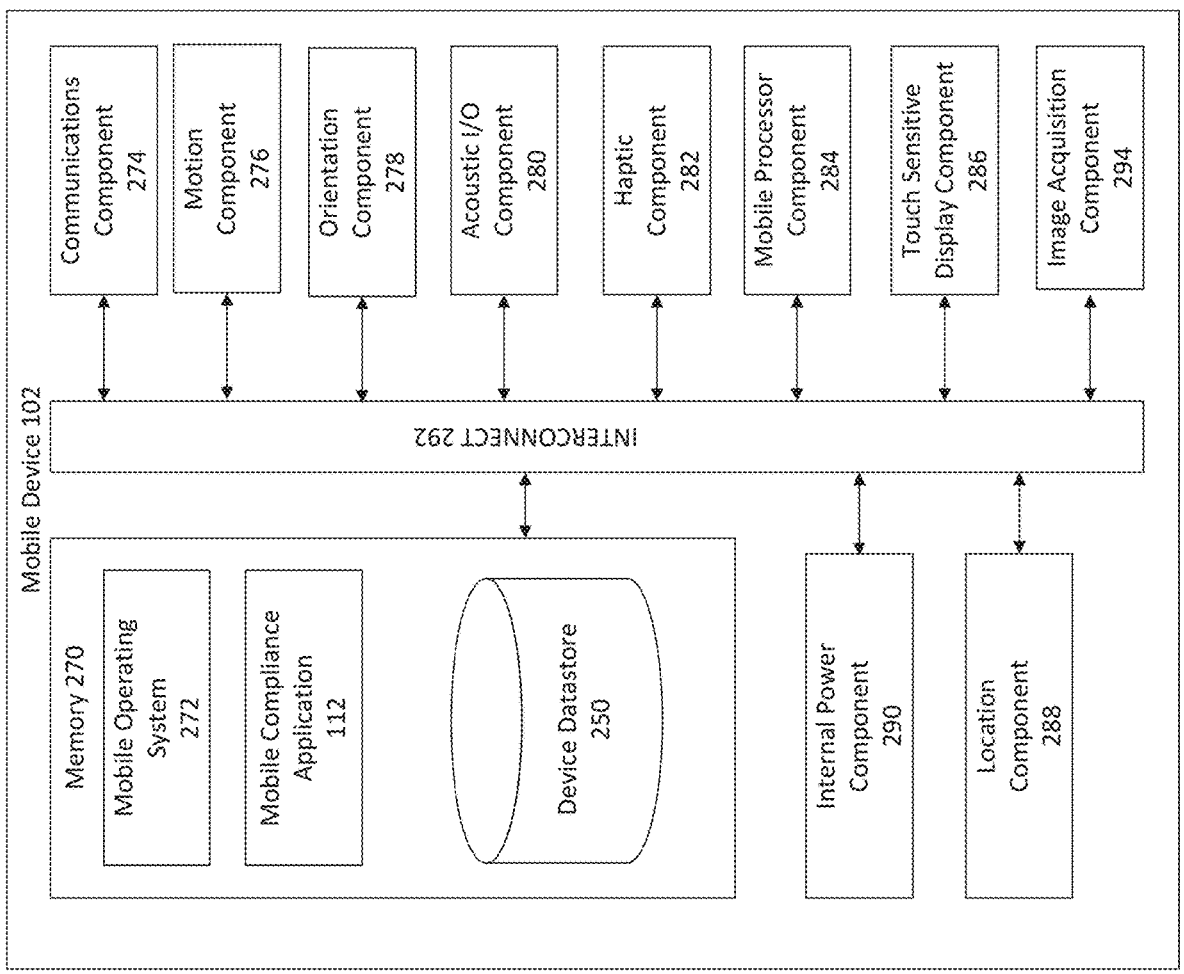
FIG. 2 illustrates an example embodiment of a mobile device executing a mobile compliance application in the system and method for efficient selection of object recognition models for computer vision.

In one embodiment, the mobile device 102 further discussed with respect to FIG. 2 may be representative of a product manufacturer's (e.g., consumer goods manufacturer, durable goods manufacturer, etc.) mobile device (e.g., a mobile phone, tablet, laptop, etc.) that is configured to execute a mobile compliance application 112. In one embodiment, the mobile compliance application 112 may be configured as a web based application or a native application executing on the mobile device 102. While not illustrated, it is to be appreciated that the mobile device 102 may also be configured to execute the compliance configuration application 110 as a web based application or a native application.

In one embodiment, the mobile compliance backend system 120 may be configured to interface with the mobile compliance application 112 to provide appropriately formatted information to and from the mobile compliance application 112 and communicate with the compliance API gateway 122. The mobile compliance backend system 120 may be further configured to maintain state information associated with the mobile compliance application 112.

In one embodiment, the compliance API gateway 122 may be configured to allow the one or more systems (e.g., mobile compliance backend system 120, etc.) to communicate with the distributed compliance system 126. For example, the compliance API gateway 122 may be configured to manage any incoming requests and provide corresponding responses between the mobile compliance backend system 120 and the distributed compliance system 126 in accordance with a specified communication protocol.

In one embodiment, the distributed compliance system 126 may be configured to allow a user to create, store, and/or otherwise manage one or more experimentation, testing, training, and validation datasets that are used to train/retrain, test, and/or validate the computer vision system 130 via the computer vision API gateway 128. In one embodiment, the distributed compliance system 126 may also be configured to provide information stored in the compliance datastores 134 (e.g., compliance audit information, one or more object recognition model lists that may include one or more object recognition model identifiers and one or more recognized object names corresponding to each object recognition model identifier, dataset identifiers, etc.) and vision support datastores 136 (e.g., experimentation, validation, training, and/or testing datasets, etc.) to the computer vision system 130, the compliance configuration application 110, and/or the mobile compliance application 112. Additionally, or alternatively, the distributed compliance system 126 may be configured to request the computer vision system 130 via the computer vision API gateway 128 to retrieve or store information (e.g., experimentation, validation, training, and/or testing datasets, etc.) in the cloud storage system 114 via a uniform resource locator (URL).

In one embodiment, the distributed compliance system 126 may include, without limitation, an object recognition application 140. In one embodiment, the compliance audit object recognition application 140 may be configured to select a minimum set of object recognition models for one or more audit images associated with one or more compliance audits. In one embodiment, the compliance audit object recognition application 140 may be further configured to request the computer vision system 130 to apply the minimum set of object recognition models object recognition models to an audit image for a particular compliance audit.

In one embodiment, the distributed compliance system 126 may also be configured to generate audit result information based at least on the recognized object information for each recognized object received from the computer vision system 130. To generate the audit result information, the distributed compliance system 126 may be configured to filter and/or combine recognized object information for each recognized object received from the computer vision system 130 based at least on the probability of correct identification that identifies the probability that the object recognition model correctly identified the recognized object. In one embodiment, the distributed compliance system 126 may be configured to request the computer vision system 130 to retrain one or more object recognition models on a periodic basis (e.g., daily, weekly, monthly basis, etc.) using one or more training datasets.

In one embodiment, the computer vision API gateway 128 may provide one or more APIs to allow one or more systems (e.g., distributed compliance system 126, etc.) to communicate with the computer vision system 130. For example, the computer vision API gateway 128 may be configured to manage any incoming requests and provide corresponding responses between the computer vision system 130 and distributed compliance system 126 in accordance with a specified communication protocol.

In one embodiment, the computer vision system 130 may be configured to generate one or more object recognition models based at least on one or more training and/or experimentation datasets. Each trained object recognition model may be identified by an object recognition model identifier that identifies a specific object recognition model. Each trained object recognition model may also be associated with one or more object names that the trained object recognition model is capable of recognizing (e.g., detect, classify, locate, identify, etc.) within an audit image. Each trained object recognition model may be stored in the model datastore 138 operatively coupled to the computer vision system 130. Additionally, each trained object recognition model's object recognition model identifier and associated one or more object names may be aggregated in one or more object recognition model lists. The one or more object recognition model lists may be stored in the model datastore 138, which is operatively coupled to the computer vision system 130, Additionally, the one or more object recognition model lists may also be stored in the compliance datastores 134, which is operatively coupled to the distributed compliance system 126.

In one embodiment, the computer vision system 130 may be configured to retrain one or more object recognition models identified by its corresponding object recognition model identifier using one or more datasets stored in the vision datastores 136 and/or in cloud storage system 114 based on a universal resource locator (URL).

In one embodiment, the computer vision system 130 may also be configured to apply one or more object recognition models identified by its corresponding object recognition model identifier to recognize one or more products within an audit image using one or more object recognition algorithms (e.g., Convolutional Neural Network (CNN), You Only Look Once (YOLO), etc.). In one embodiment, the computer vision system 130 may also be configured to provide at least a portion of recognized object information for each recognized object.

For example, the recognized object information may include, without limitation, one or more recognized object tags that identifies one or more rectangular regions of a recognized object within the audit image, a recognized object name identifying a name (or a label) of the recognized object within the audit image, a recognized object unique identifier that uniquely identifies the recognized object, and recognized object facing count that indicates a number of facings for a recognized object within the audit image. Additionally, and for each recognized object, the computer vision system 130 may also be configured to provide an object recognition model identifier that identifies an object recognition model that was applied and probability of correct identification that identifies the probability that the object recognition model correctly identified the recognized object.

In one embodiment, the vision support datastores 136 (e.g., Salesforce files, etc.) may be configured to store experimentation, testing, training, and/or validation datasets for training one or more object recognition models. Each dataset may correspond to a dataset identifier. Each dataset may include one or more product images, corresponding one or more product names, and corresponding one or more product tags that identify a region (e.g., a rectangular region) of where the product is within the one or more product images (e.g., csv file identifying pixel coordinates of the rectangular region). In one embodiment, the cloud storage system 114 (e.g., Dropbox, Google Drive, etc.) may be configured to store experimentation, testing, training, and/or validation datasets which may be identified by an associated URL.

In one embodiment, the compliance datastores 134 may be configured to manage metadata associated with the one or more experimentation, testing, training, and validation datasets and one or more object recognition models (e.g., one or more object recognition model lists that may include one or more object recognition model identifiers, one or more object names corresponding to each object recognition model identifier, dataset identifier corresponding to each dataset, etc.) generated by the computer vision system 130 and/or distributed compliance system 126.

Additionally, the compliance datastores 134 may also be configured to store at least a portion of the compliance audit information which may include information relating to one or more visual marketing campaigns (e.g., one or more planograms) at one or more physical locations (e.g., stores) for one or more product manufacturers. For example, the compliance audit information for a planogram may include a reference image that is compliant and includes of one or more reference products for sale as arranged at a physical location (e.g., a planogram in a store, etc.), the compliance audit information may further include a set of reference products included in the reference image, where each reference product is represented as reference product information. Additionally, the compliance audit information may also include an audit identifier that uniquely identifies a particular compliance audit using for example an alpha numeric identifier (e.g., "Fixture ID 124423," "Fixture ID 3490257," etc.).

In one embodiment, the reference product information for each reference product may include a reference product image that represents a digital image of a physical product for sale within the reference image, a reference product name identifying a name (or label) of the reference product, a reference product placement description that identifies a placement location of the reference product and a number of facings at the placement location, a reference product facing count that indicates a number of facings for the reference product within the reference image, and a reference product share of shelf that identifies a percentage of the reference product facing count as compared to all available facings within the reference image.

FIG. 2 illustrates an example block diagram 200 of an example embodiment of the mobile device 102 executing a mobile compliance application 112. The mobile compliance application 112 (e.g., a mobile phone, tablet, laptop, etc.) may be generally configured to enable or allow a user to perform compliance audits by transmitting audit images and receiving audit result information. It is to be appreciated that while FIG. 2 illustrates one example embodiment of the mobile device 102, the example embodiment is not limited to this context.

In one embodiment, the mobile device 102 may be generally arranged to provide mobile computing and/or mobile communications and may include, but are not limited to, memory 270, communications component 274, motion component 276, and orientation component 278, acoustic input/output component 280, haptic component 282, mobile processor component 284, touch sensitive display component 286, location component 288, internal power component 290, and image acquisition component 294, where each of the components and memory 270 may be operatively connected via interconnect 292.

In one embodiment, the memory 270 may be generally arranged to store information in volatile and/or nonvolatile memory, which may include, but is not limited to, read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM) flash memory, polymer memory such as ferroelectric polymer memory, ovonic memory, phase change or ferroelectric memory, silicon-oxide-nitride-oxide-silicon (SONOS) memory, solid state memory devices (e.g., USB memory, solid state drives SSD, etc.), and/or any other type of storage media configured for storing information.

In one embodiment, the memory 270 may include instruction information arranged for execution by the mobile processor component 284. In that embodiment, the instruction information may be representative of at least one operating system 272, one or more applications, which may include, but are not limited to, mobile compliance application 112. In an embodiment, the memory 270 may further include device datastore 250 which may be configured to store information associated with the mobile compliance application 112 (e.g., audit images, compliance audit information, audit result information, etc.).

In one embodiment, the mobile operating system 272 may include, without limitation, mobile operating systems (e.g., Apple®, iOS®, Google® Android®, Microsoft® Windows Phone®, Microsoft® Windows®, etc.) generally arranged to manage hardware resources (e.g., one or more components of the mobile device 102, etc.) and/or software resources (e.g., one or more applications of the mobile device 102, etc.).

In one embodiment, the communications component 274 may be generally arranged to enable the mobile device 102 to communicate, directly and/or indirectly, with various devices and systems (e.g., mobile compliance back end system 120, configuration API gateway 124, Cloud Storage System 114, etc.). The communications component 274 may include, among other elements, a radio frequency circuit (not shown) configured for encoding and/or decoding information and receiving and/or transmitting the encoded information as radio signals in frequencies consistent with the one or more wireless communications standards (e.g., Bluetooth, Wireless IEEE 802.11, WiMAX IEEE 802.16, Global Systems for Mobile Communications (GSM), Enhanced Data Rates for GSM Evolution (EDGE), Long Term Evolution (LTE), Bluetooth standards, Near Field Communications (NFC) standards, etc.).

In one embodiment, the motion component 276 may be generally arranged to detect motion of the mobile device 102 in one or more axes. The motion component 276 may include, among other elements, motion sensor (e.g., accelerometer, micro gyroscope, etc.) to convert physical motions applied to or exerted on the mobile device 118-1 into motion information.

In one embodiment, the orientation component 278 may be generally arranged to detect magnetic fields for measuring the strength of magnetic fields surrounding the mobile device 102. The orientation component 278 may include, among other elements, magnetic sensor (e.g., magnetometer, magnetoresistive permalloy sensor, etc.) to convert magnetic field applied to or exerted on the mobile device 102 into orientation information, which may identify a number of degrees from a reference orientation the mobile device 102 is oriented or otherwise pointed.

In one embodiment, the acoustic input/output (I/O) component 280 may be generally arranged for converting sound, vibrations, or any other mechanical waves received by the mobile device 102 into digital or electronic signals representative of acoustic input information utilizing one or more acoustic sensors (e.g., microphones, etc.), which may be located or positioned on or within the housing, case, or enclosure of the mobile device 102 to form a microphone array. Additionally, the acoustic I/O component 280 may be further arranged to receive acoustic output information and convert the received acoustic output information into electronic signals to output sound, vibrations, or any other mechanical waves utilizing the one or more electroacoustic transducers (e.g., speakers, etc.) which may be located or positioned on or within the housing, case, or enclosure of the mobile device 102. Additionally, or alternatively, the acoustic output information and/or the covered electronic signals may be provided to one or more electroacoustic transducers (e.g., speakers, etc.) operatively coupled to the mobile device 102 via wired and/or wireless connections.

In one embodiment, the haptic component 282 may be generally arranged to provide tactile feedback with varying strength and/or frequency with respect to time through the housing, case, or enclosure of the mobile device 102. Moreover, the haptic component 282 may include, among other elements, a vibration circuit (e.g., an oscillating motor, vibrating motor, etc.) arranged to receive haptic output information and convert the received haptic output information to mechanical vibrations representative of tactile feedback.

In one embodiment, the mobile processor component 284 may be generally arranged to execute instruction information, which may generally including one or more executable and/or interpretable instructions. In an embodiment, the processor component 284 may be a mobile processor component or system-on-chip (SoC) processor component which may comprise, among other elements, processor circuit, which may include, but is not limited to, at least one set of electronic circuits arranged to execute one or more instructions. Examples of mobile processor components 284 may include, but is not limited to, Qualcomm® Snapdragon®, NVidia® Tegra®, Intel® Atom®, Samsung® Exynos, Apple® A7®-A13®, or any other type of mobile processor(s) arranged to execute the instruction information including the one or more instructions stored in memory 270.

In one embodiment, the touch sensitive display component 286 may be generally arranged to receive and present visual display information, and provide touch input information based on detected touch based or contact based input.

Moreover, the touch sensitive display component 286 may include, among other elements, display device (e.g., liquid-crystal display, light-emitting diode display, organic light-emitting diode display, etc.) for presenting the visual display information and touch sensor(s) (e.g., resistive touch sensor, capacitive touch sensor, etc.) associated with the display device 268 to detect and/or receive touch or contact based input information associated with the display device of the mobile device 102. Additionally, the touch sensor(s) may be integrated with the surface of the display device, so that a user's touch or contact input may substantially correspond to the presented visual display information on the display device, such as, for example, one or more user interface (UI) elements discussed and illustrated in FIGS. 7A-7D.

In one embodiment, the location component 288 may be generally arranged to receive positioning signals representative of positioning information and provide location information (e.g., approximate physical location of the mobile device 102) determined based at least partially on the received positioning information. Moreover, the location component 288 may include, among other elements, positioning circuit (e.g., a global positioning system (GPS) receiver, etc.) arranged to determine the physical location of the mobile device 102. In some embodiments, the location component 288 may be further arranged to communicate and/or interface with the communications component 274 in order to provide greater accuracy and/or faster determination of the location information.

In one embodiment, the internal power component 290 may be generally arranged to provide power to the various components and the memory of the mobile device 102. In one embodiment, the internal power component 290 may include and/or be operatively coupled to an internal and/or external battery configured to provide power to the various components (e.g., communications component 274, motion component 276, memory 270, etc.). The internal power component 290 may also be operatively coupled to an external charger to charge the battery.

In one embodiment, the image acquisition component 294 may be generally arranged to generate a digital image information using an image capture device such as, for example, a charged coupled device (CCD) image sensor (Not shown). Moreover, the image acquisition component 294 may be arranged to provide or otherwise stream digital image information captured by a CCD image sensor to the touch sensitive display component 286 for visual presentation via the interconnect 292, the mobile operating system 272, mobile processor component 284.

In one embodiment, and as previously discussed, the mobile compliance application 112 may be generally configured to enable a user (e.g., an auditor, sales representative, merchandiser, etc.) associated with a product manufacturer to audit its compliance of one or more planograms at a physical location using cloud based computer vision. Moreover, to enable a user to perform compliance auditing the mobile compliance application 112 may be configured to visually present one or more UI views via the touch sensitive display component 286 as further discussed and illustrated with respect to FIGS. 7A-7D. Additionally, the mobile compliance application 112 may be further configured to receive one or more selections of one or more UI elements via the touch sensitive display component 286 as further discussed and illustrated in FIGS. 7A-7D. Furthermore, to visually present one or more UI views, the mobile compliance application 112 may be further configured to request and receive various information via the communications component 274 from the mobile compliance backend system 120 as discussed herein.

Figure 3:
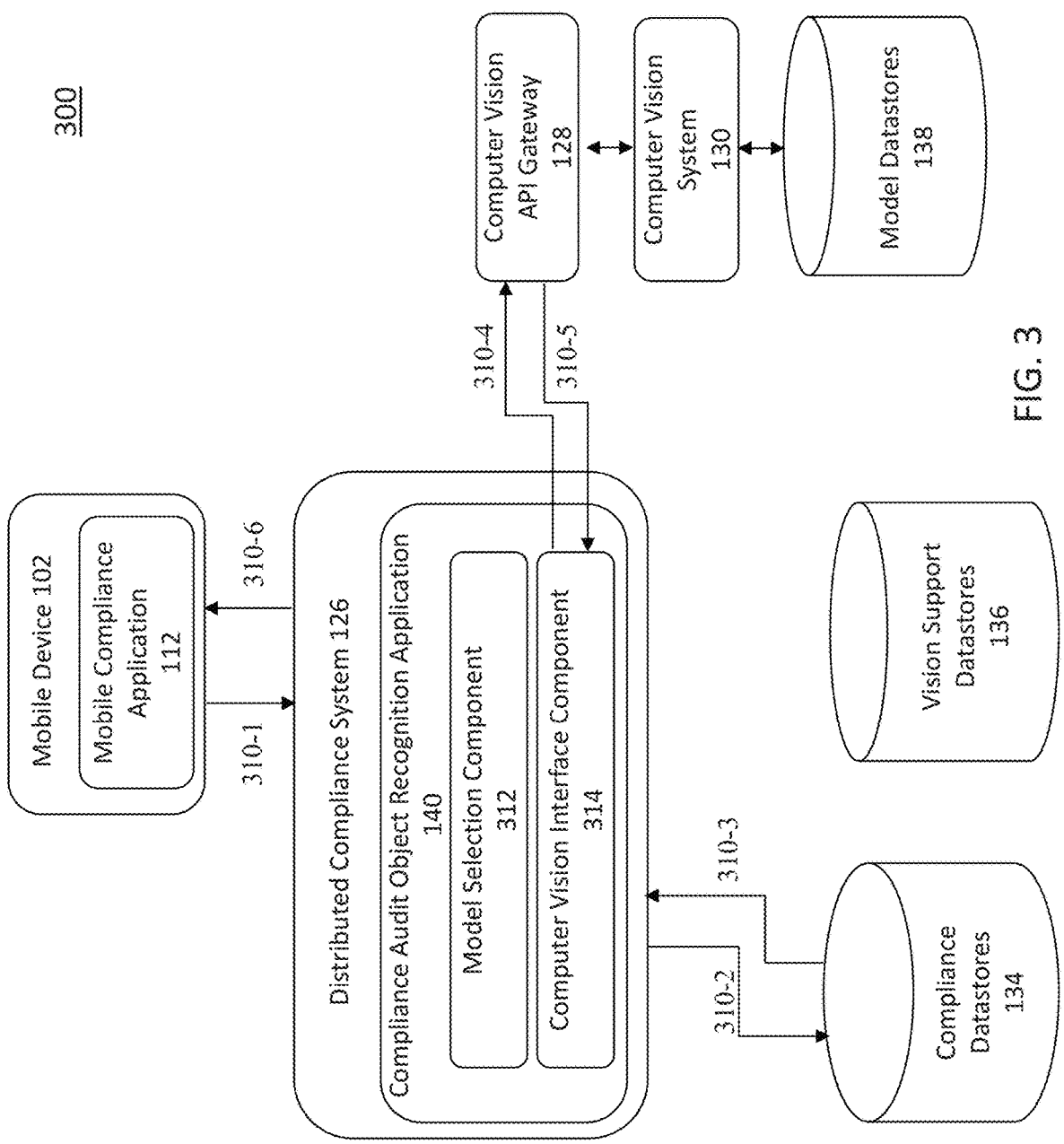
FIG. 3 illustrates an example embodiment of an object recognition application configured to efficiently select a minimum set of object recognition models for computer vision.

FIG. 3 illustrates an example block diagram 300 of an object recognition application configured to efficiently select a minimum set of object recognition models for computer vision.

In one embodiment, the compliance audit object recognition application 140 may include, without limitation, a model selection component 312 and a computer vision interface component 314. In one embodiment, the model selection component 312 may be configured to perform model selection using example embodiments further discussed with respect to FIGS. 5, 6A-6I, 8, 9A-8B, in response to receiving a compliance audit request from a mobile device (e.g., mobile device 102, etc.) to perform a compliance audit for a marketing campaign captured in an audit image. In one embodiment and after at least one model the computer vision interface component 314, may be configured to request the computer vision system 130 via the computer vision API gateway 128 to perform object recognition for the audit image using a selected object recognition model identifier.

In one example operation as illustrated in FIG. 3, a user (e.g., a compliance auditor, etc.) associated with a product manufacturer may at stage 310-1 request a compliance audit for a planogram at a particular store using the mobile compliance application 112, which is further discussed with respect to at least FIGS. 7A-7D. Moreover, at stage 310-1, the mobile compliance application 112 may transmit a compliance audit request, which may include, without limitation, an audit image generated by the mobile compliance application 112 and an associated audit identifier. The compliance audit request may then be transmitted to distributed compliance system 126 via the mobile compliance backend system 120 and the compliance API gateway 122 (not shown in FIG. 3).

Continuing with the above example operation and based at least on the compliance audit request, the compliance audit object recognition application 140 may determine: (1) a required object recognition list (e.g., required object recognition list 510 of FIGS. 5, etc.) that identifies a list of object names that are to be recognized for a particular compliance audit; and (2) a object recognition model list (e.g., object recognition model list 410 of FIG. 4) that identifies a list of object recognition model identifiers and corresponding recognized object names for a particular product manufacturer and its marketing campaign.

To determine the required object recognition list and the object recognition model list, at stage 310-2, the compliance audit object recognition application 140 may use the audit identifier received in the compliance audit request to request a corresponding compliance audit information and an object recognition model list from the compliance datastores 134. At stage 310-3, the compliance audit object recognition application 140 may then receive the corresponding compliance audit information and object recognition model list from the compliance datastores 134. The compliance audit object recognition application 140 may then generate the required object recognition list (e.g., required object recognition list 510 of FIG. 5, etc.) by using the one or more reference product names from the received compliance audit information. The one or more product names may identify various products that are to be recognized by computer vision system 130 for the compliance audit request.

Continuing with the above example operation at stage 310-4, the computer vision interface component 314 may then request the computer vision API gateway 128 to apply a minimum set of object recognition models to the audit image to recognize one or more products within the audit image. The minimum set of object recognition models may be determined by the model selection component 312 based at least on the received object recognition model list and the generated required object recognition list. These operations of the model selection component 312 and the computer vision interface component 314 are further discussed with respect to FIGS. 5, 6A-6I, and 9A-9B.

Continuing with the above example operation and at the stage 310-5, the computer vision system 130 may generate at least a portion of the recognized object information for each recognized object in the audit image in response to the request received from the computer vision interface component 314 at stage 310-4. Additionally, and for each recognized object, the computer vision system 130 may also transmit an object recognition model identifier that identifies an object recognition model that was applied and a probability of correct identification that identifies the probability that the object recognition model correctly identified the recognized object.

Continuing with the above second example operation and at stage 310-5, the compliance audit object recognition application 140 may generate audit result information based at least on the recognized object information for each recognized object received from the computer vision system 130. To generate the audit result information, the computer vision system 130 may be configured to filter and/or combine recognized object information for each recognized object received from the computer vision system 130 based at least on the probability of correct identification that identifies the probability that the object recognition model correctly identified the recognized object.

At stage 310-6, the compliance audit object recognition application 140 may provide the audit result information to the mobile device via the compliance API gateway 122 and the mobile compliance backend system 120, where the mobile device 102 will visually present the at least a portion of the audit result information as further discussed with respect to at least FIGS. 7A-7D.

FIG. 4 illustrates an example embodiment 400 of an object recognition model list used in the selection of object recognition models for computer vision. As illustrated in FIG. 4, the object recognition model list 410 for a particular product manufacturer may include one or more model identifiers (e.g., object recognition model identifier 412-1, object recognition model identifier 412-2, object recognition model identifier 412-3, . . . object recognition model identifier 412-a, etc.) that identify a trained object recognition model stored in model datastores 138. Each model identifier of the one or more model identifiers may also correspond with one or more object names (e.g., object name 420-1, object name 420-2, object name 420-3, . . . object name 420-b, etc.) that are recognized by the trained object recognition model.

For example, model identifier 412-1 may be represented as a unique identifier (e.g., alphanumeric identifier including white spaces such as "Alpine Cereal Recognition Model 01-01-2020," etc.) that identifies a specific object recognition model stored in the model datastores 138. Additionally, the model identifier 412-1 may correspond to object names 420-1, 420-2, and 420-3, where each object name be represented as a unique identifier (e.g., alphanumeric identifier including white spaces such as "Bran Cereal," "Oat Cereal," "Corn Flakes," etc.).

FIG. 5 illustrates an example diagram 500 of a first method for selecting and applying a minimum set of object recognition models for computer vision. Moreover, in this example embodiment, the first method of selecting a minimum set of object recognition models to recognize all object names within the required object recognition list 510 is to use an iterative method as illustrated in iterative method table 512. This iterative method as illustrated in iterative method table 512 may be implemented by the model selection component 312 of FIG. 3. As illustrated in this example embodiment, it is assumed that the object recognition model list 410 includes object recognition model identifiers 412-1, 412-2, and 412-3. Additionally as illustrated in FIG. 5, it is further assumed that the previously generated required object recognition list 510 may include only object names 420-2, 420-4, and 420-6.

It is to be appreciated that these assumptions are merely for purposes of illustration and not limitation as in actual implementation, the number of object names in the required object recognition list 510 and the number of object recognition model identifiers may vary greatly by size. Additionally, as further explained below, the number of iterations in the iterative method table 512 could also vary greatly depending on the number of object names in the required object recognition list 510 and the number of object recognition model identifiers in the object recognition model list 410.

As illustrated in FIG. 5, the iterative approach may use multiple iterations (e.g., iterations 1-7) to determine all possible permutations of the object recognition models having corresponding object recognition model identifiers 412-1, 412-2, and 412-3. As illustrated in iterative method table 512 and depending on which object recognition model identifier is used (e.g., marked "use") and which ones are ignored (e.g., marked "ignore") by the computer vision system 130, each iteration may result in a unique/non-unique combination of object names (e.g., aggregate recognized object name column) that may be recognized by the computer vision system 130. However, not all combinations or sets of object recognition model identifiers, when used by the computer vision system 130, are capable of recognizing all the object names in the required object recognition list 510 as illustrated in the iterative method table 512.

And while it may appear straight forward to request the computer vision system 130 to use all available object recognition model identifiers (e.g., iteration 7 where all available object recognition model identifiers 412-1, 412-2, and 412-3 are marked "use") and consequently, apply all corresponding object recognition models, such a request would result in great computational inefficiencies and even substantial computational delay. These inefficiencies and delays may be further amplified when multiple compliance audit requests are received each with its own audit image that are to be recognized by the computer vision system 130. Therefore, a minimum set of object recognition model identifiers is required to be selected. As shown in iterative method table 512, iteration 6 identifies the minimum set of object recognition model identifiers that can recognize all object names within the required object recognition list 510.

However, this iterative method requires the model selection component 312 to iterate through all possible permutations of object recognition model identifiers, which may include $2^n$ different possible sets of object recognition model identifiers, where n is the total number of object recognition model identifiers available for use by the computer vision system 130. With large number of object recognition models available to the computer vision system 130, the identification of a minimum set of object recognition model identifiers that can recognize all object names within the required object recognition list 510 may be computationally inefficient and may result in large delay before even applying any object recognition models to an audit image. Indeed, in the context of run time or space requirements, such an iterative method as discussed above would have an exponential space complexity, i.e., $O(2^n)$ where n is the total number of object recognition model identifiers.

FIGS. 6A-6I illustrate an example logic flow 600 of a second method for selecting and applying a minimum set of object recognition models for computer vision. Moreover, in this example embodiment, the second method of selecting a minimum set of object recognition models to recognize all object names within the required object recognition list 510 uses an efficient non-iterative method as illustrated in FIGS. 6A-6I. As an alternative to the iterative method of FIG. 5, the model selection component 312 of FIG. 3 may be configured perform this efficient non-iterative method illustrated in FIGS. 6A-6I. In this example embodiment and although not directly illustrated, it is assumed that the object recognition model list 410 may only include object recognition model identifiers 412-1, 412-2, 412-3 and 412-4 and their corresponding recognized object names as illustrated in FIG. 4. Similarly, although not directly illustrated, it is further assumed that the previously generated required object recognition list 510 may only include object names 420-2, 420-4, and 420-6.

Figure 6A:
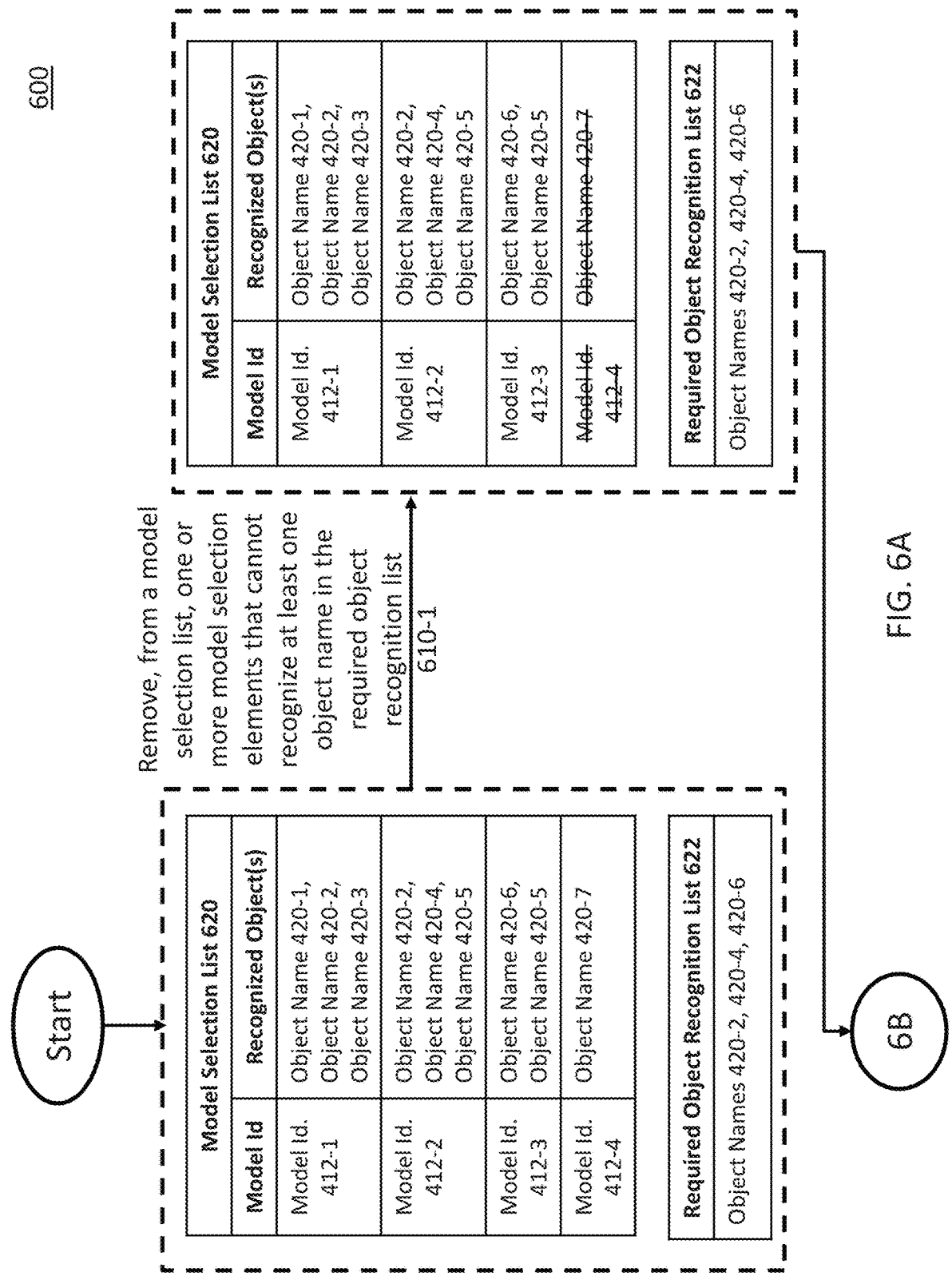
FIGS. 6A-6I illustrate an example embodiment of a second method for selecting and applying a minimum set of object recognition models for computer vision.

As illustrated in FIG. 6A, the model selection component 312 may begin by creating a local or mutable copy of the required object recognition list (e.g., required object recognition list 510, etc.) previously generated by the compliance audit object recognition application 140. Thus and based on the assumption discussed above, a local or mutable copy of the required object recognition list 510 may be created as required object recognition list 622, which may only include object names 420-2, 420-4, and 420-6. Additionally the model selection component 312 may also create a local or mutable copy of the previously determined object recognition model list 410. Thus and based on the assumption discussed above, a local or mutable copy of the object recognition model list 410 may be created as the model selection list 620, which may only include four model selection elements. The four model selection elements may respectively include object recognition model identifiers 412-1, 412-2, 412-3 and 412-4 and their corresponding recognized object names as illustrated in FIG. 6A.

As illustrated in FIG. 6A and at stage 610-1, the model selection component 312 may remove, from a model selection list, one or more model selection elements that cannot recognize at least one object name in the required object recognition list. For example, the model selection component 312 may remove (illustrated with strikethroughs throughout), from a model selection list 620, model selection element having object recognition model identifier 412-4 and corresponding object name 420-7 because that model selection element cannot recognize object names 420-2, 420-4, and 420-6 in the required object recognition list 622.

Figure 6B:
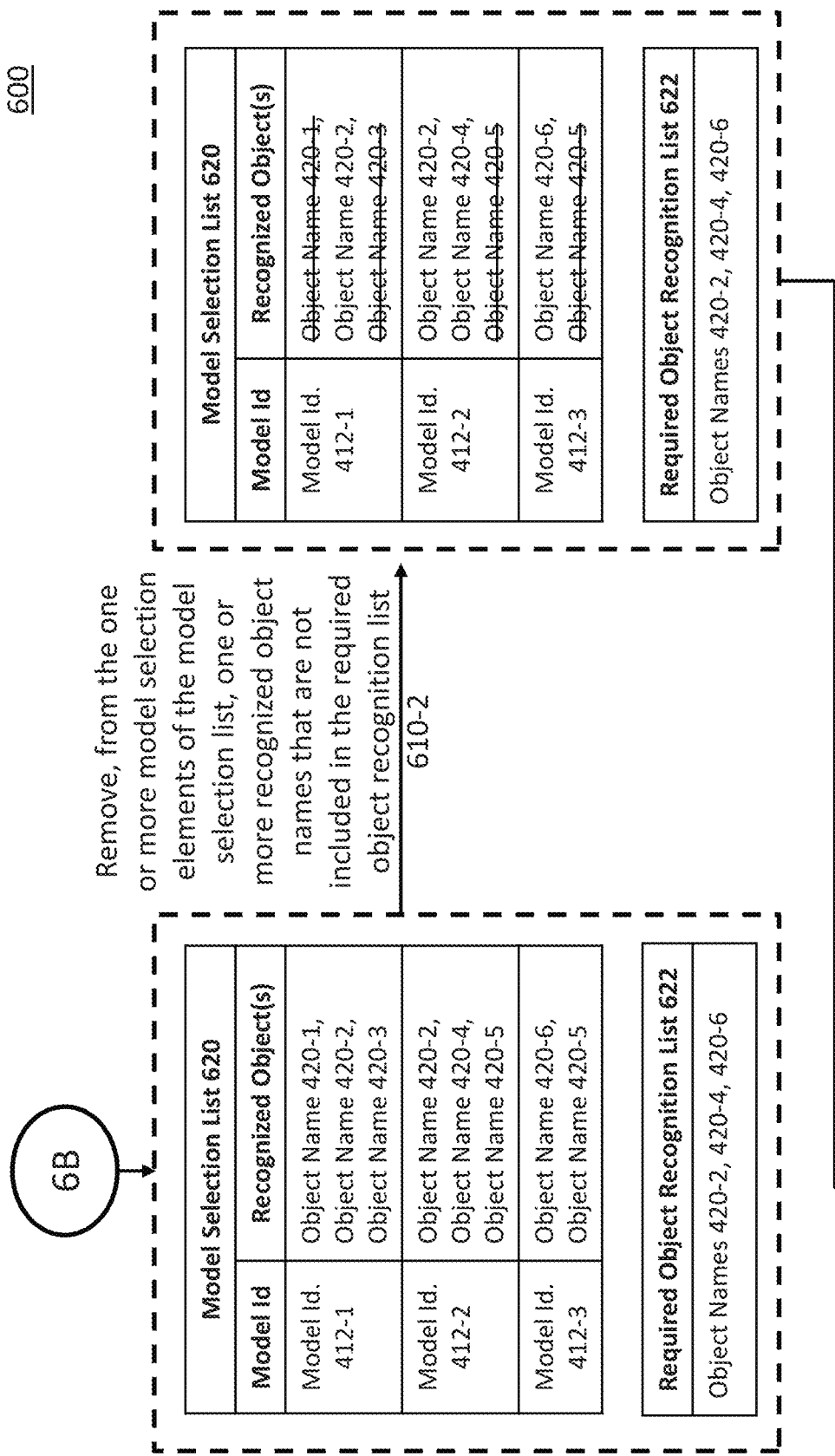

As illustrated in FIG. 6B and at stage 610-2, the model selection component 312 may remove, from the one or more model selection elements of the model selection list, one or more recognized object names that are not included in the required object recognition list. For example, the model selection component 312 may remove, from the model selection list 620, object names 420-1, 420-3, and 420-5 that are not included in the required object recognition list from each of the remaining model selection elements in the model selection list 620.

Figure 6C:
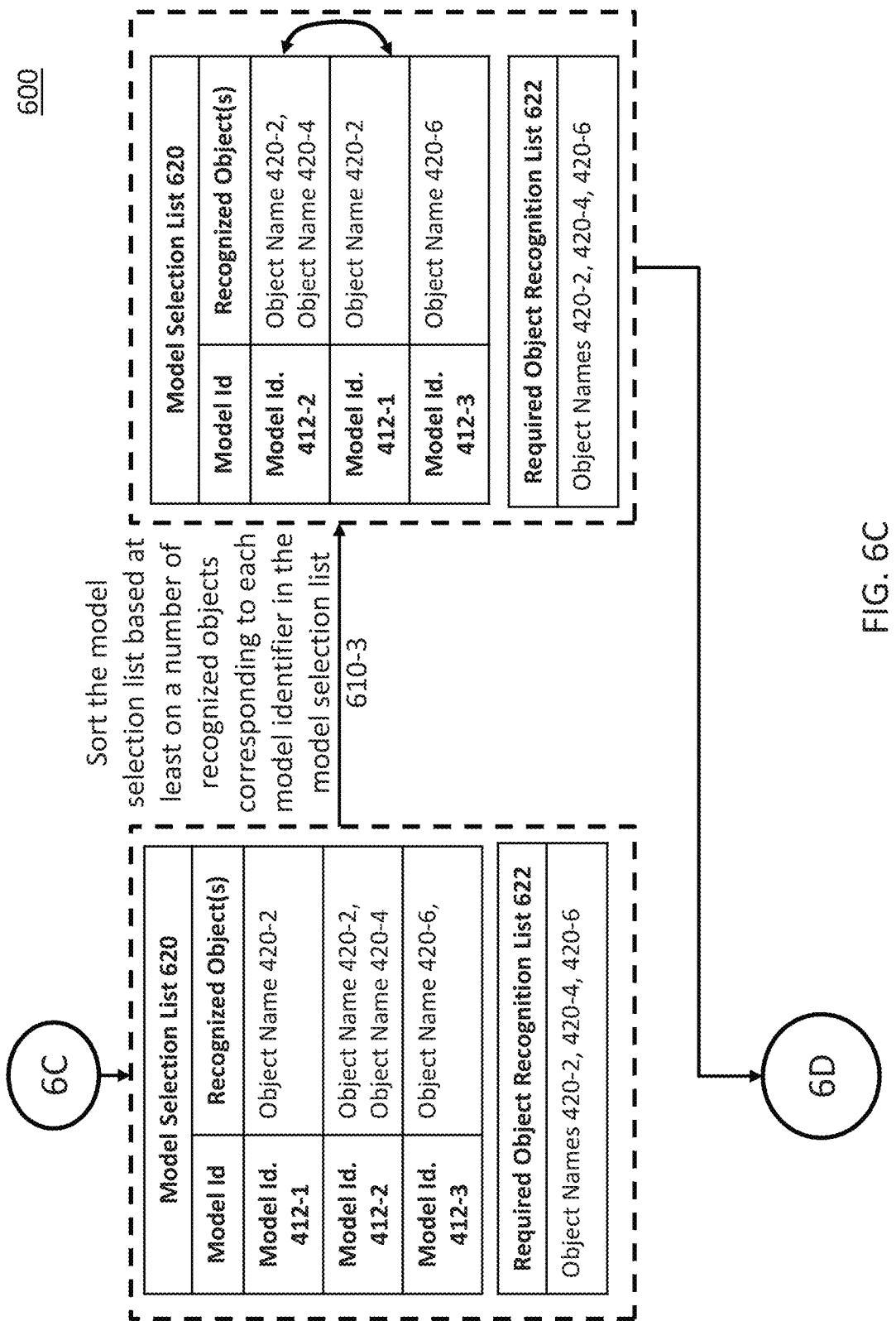

As illustrated in FIG. 6C and at stage 610-3, the model selection component 312 may sort the model selection list based at least on a number of recognized objects corresponding to each model identifier in the model selection list. For example, the model selection component 312 may sort the model selection list 620 in a descending order starting with an object recognition model identifier having a highest number of corresponding object names still remaining in the model selection list 620 and ending with an object recognition model identifier having a lowest highest number of corresponding object names still remaining in the model selection list 620.

Also illustrated in FIG. 6C, to sort the model selection list 620, the model selection component 312 may swap the location of the model selection element having the object recognition model identifier 412-2 with the location of the model selection element having the object recognition model identifier 412-1. While not discussed in detail, it is to be appreciated that various known sorting algorithms may be use by the model selection component 312 to sort the model selection list 620. These sorting algorithms may include, without limitation, quick sort, merge sort, bubble sort, insertion sort, and/or the like.

Figure 6D:
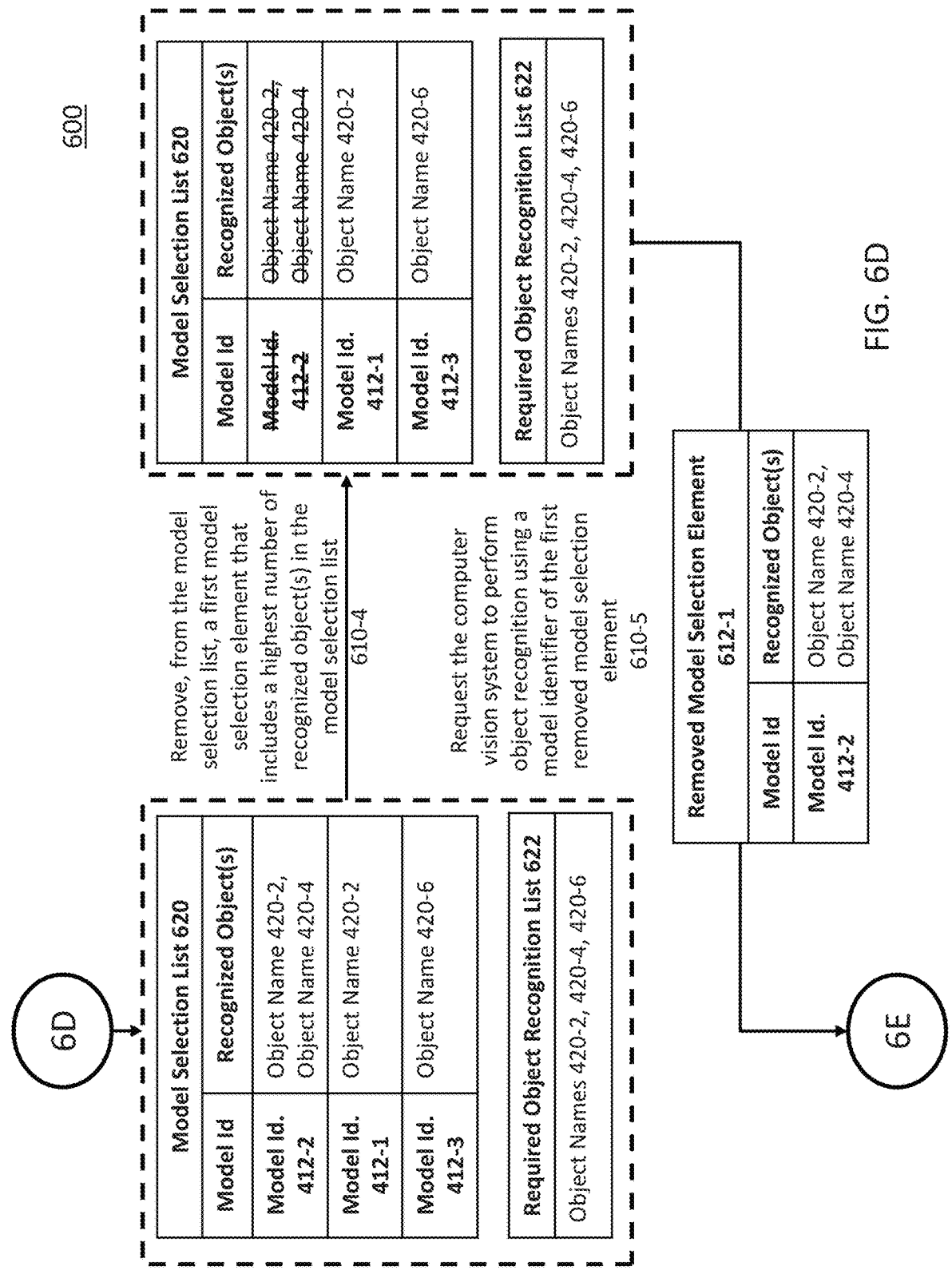

As illustrated in FIG. 6D and at stage 610-4, the model selection component 312 may remove, from the model selection list, a first model selection element that includes a highest number of recognized object(s) in the model selection list. For example, the model selection component 312 may remove a first model selection element having the object recognition model identifier 412-2 from the model selection list 620 because that model selection element has the highest number of recognized objects, i.e., two, in the model selection list 620. It is to be appreciated that because the model selection list 620 has been previously sorted immediately prior at stage 610-3, the topmost model selection element, i.e., the first model selection element, in the model selection list 620 may typically be the model selection element that has the highest number of recognized object(s).

Also illustrated in FIG. 6D and at stage 610-5, the computer vision interface component 314 may request the computer vision system to perform object recognition using a model identifier of the first removed model selection element. For example, the computer vision interface component 314 may request the computer vision system 130 to perform object recognition on an audit image for a compliance audit using an object recognition model that is identified by the object recognition model identifier 412-2 of the first removed model selection element.

Although not illustrated in FIG. 6D, it is to be appreciated that upon receipt of the request, computer vision system 130 may then apply an object recognition model having the object recognition model identifier 412-2 to the audit image, and generate first recognized object information. The computer vision system 130 may then transmit the generated first recognized object information to the computer vision interface component 314 where the first recognized object information may be temporarily cached or stored until a minimum set of object recognition models have been applied and audit result information has been generated based at least on all the recognized object information.

Figure 6E:
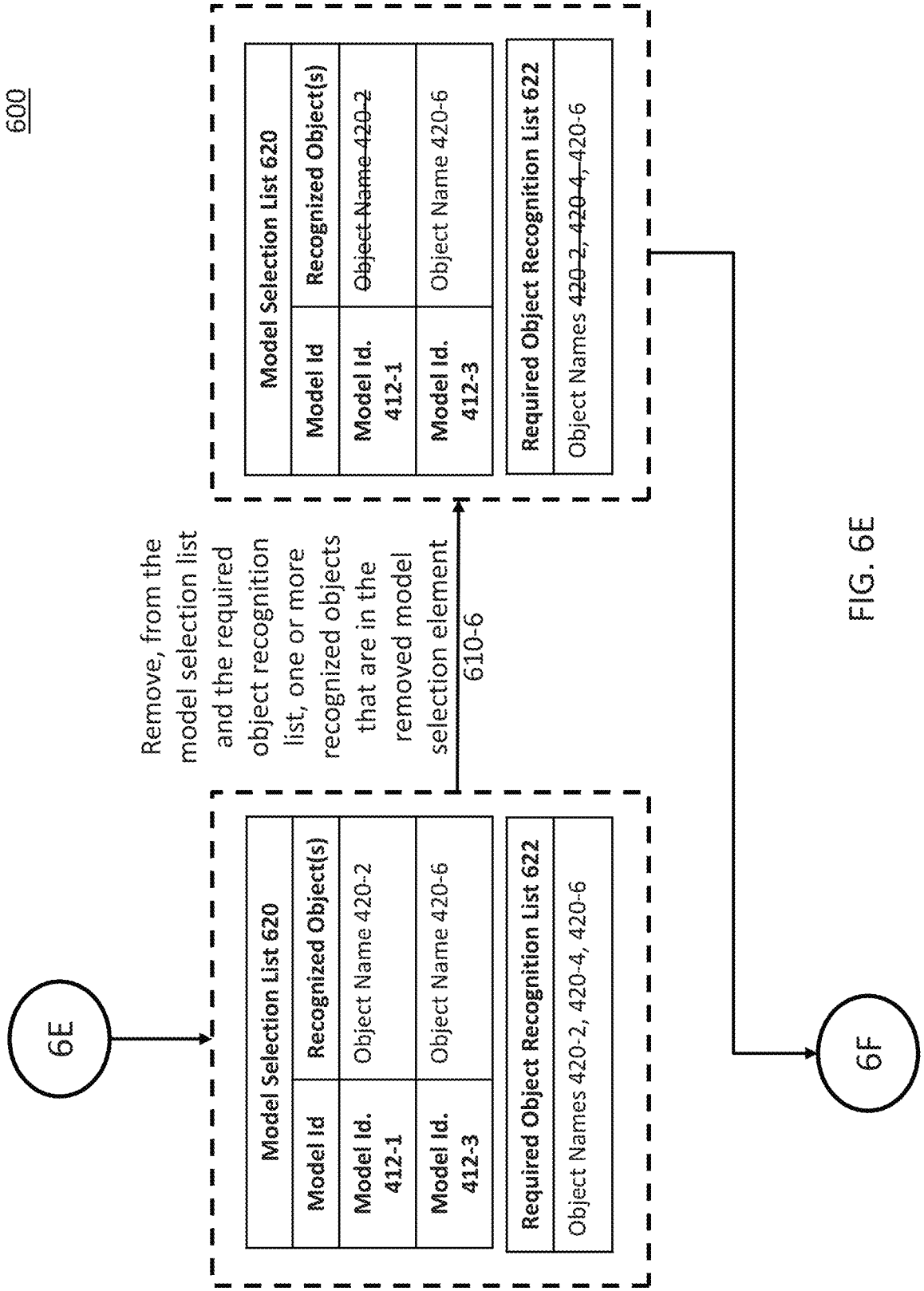

As illustrated in FIG. 6E and at stage 610-6, the model selection component 312 may remove, from the model selection list and the required object recognition list, one or more recognized objects that are in the removed model selection element. For example, the model selection component 312 may remove, from one or more model selection elements of the model selection list 620, object names 420-2 and 420-4, which is the first removed model selection element 612-1. However, because object name 420-4 is no longer within any model selection elements of the model selection list 620, only object name 420-2 is removed. Similarly, the model selection component 312 may remove, from the required object recognition list 622, object names 420-2 and 420-4.

Figure 6F:
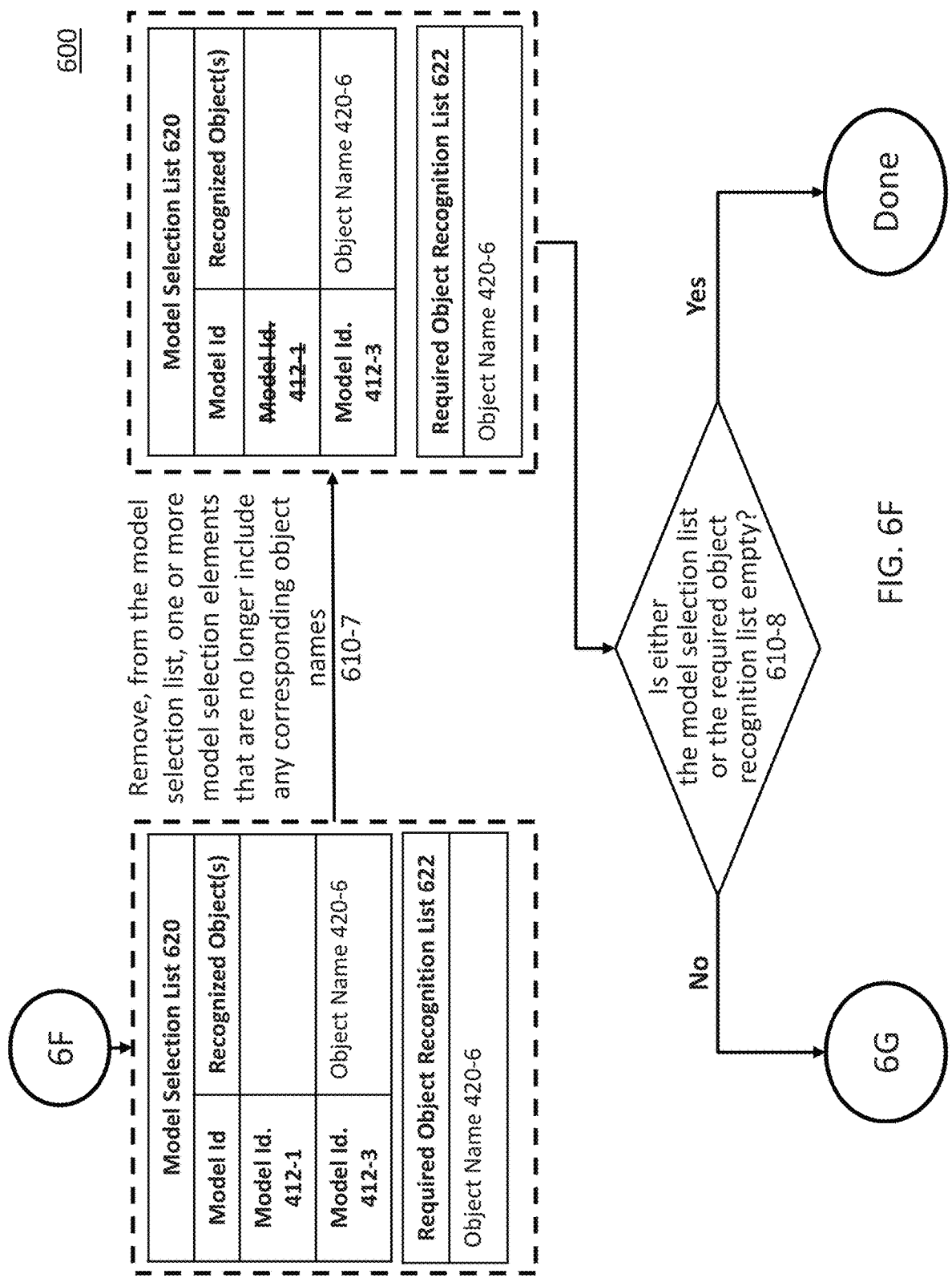

As illustrated in FIG. 6F and at stage 610-7, the model selection component 312 may remove, from the model selection list, one or more model selection elements that are no longer include any corresponding object names. For example, the model selection component 312 may remove from the model selection list 620, the model selection element having object recognition model identifier 412-1 because it no longer include any corresponding object names.

Also illustrated in FIG. 6F and at stage 610-8, the model selection component 312 may determine whether either the model selection list or the required object recognition list empty. For example, the model selection component 312 may determine whether the model selection list 620 no longer contains any model selection elements. Similarly, the model selection component 312 may also determine whether required object recognition list no longer contains any object names. If the answer to either inquiry is "Yes" then the second method of selecting a minimum set of object recognition models to recognize all object names within the required object recognition list 510 has completed. If the answer to both inquiry is "No," which is the case here as illustrated in FIG. 6F, the method continues to FIG. 6G.

Figure 6G:
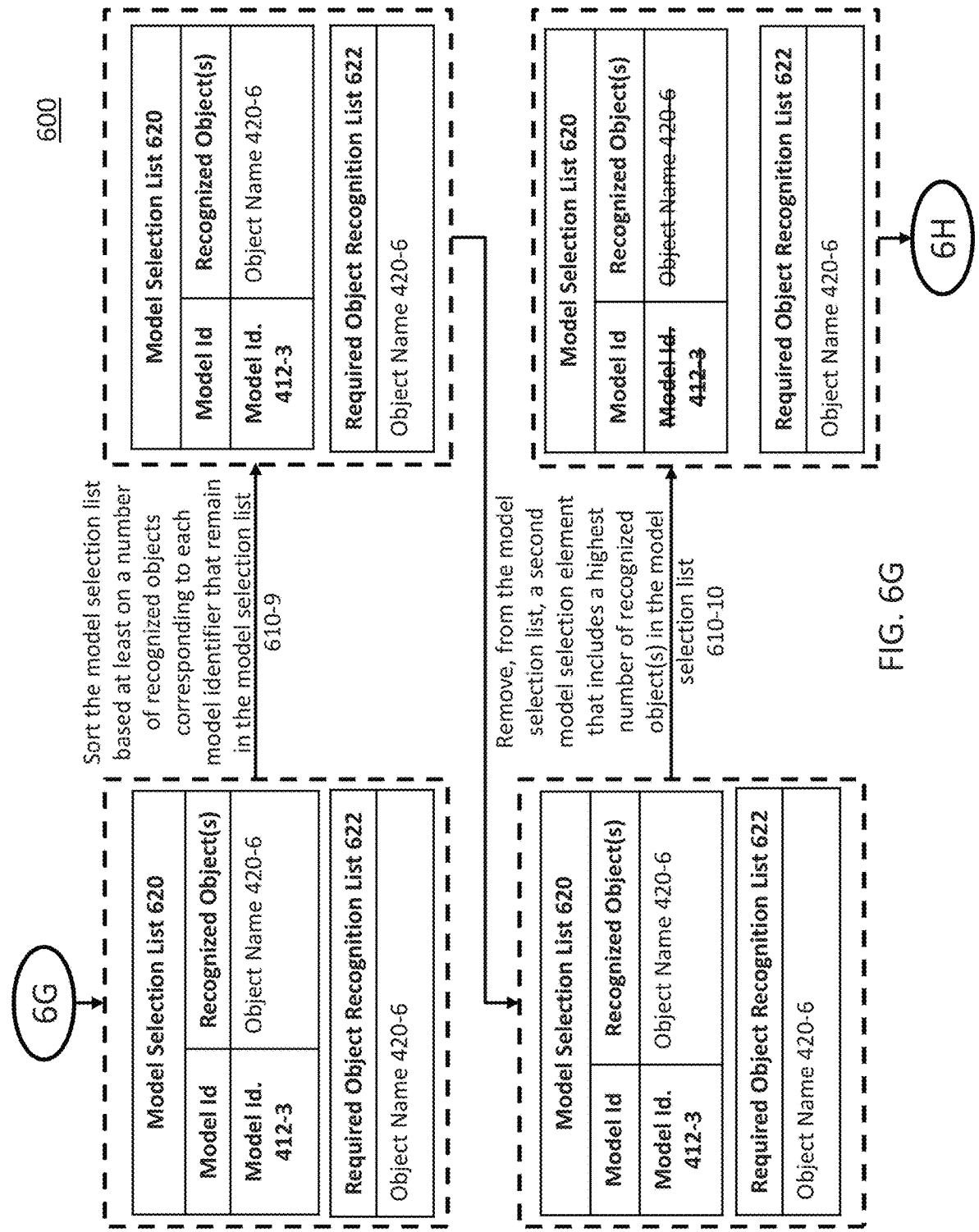

As illustrated in FIG. 6G and at stage 610-9, the model selection component 312 may sort the model selection list based at least on a number of recognized objects corresponding to each model identifier that remain in the model selection list. For example, the model selection component 312 may sort the model selection list 620 in a descending order in a similar manner as discussed at stage 610-3. However, it is to be appreciated that because the model selection list 620 contains only one model selection element, stage 610-9 may be optional.

As illustrated in FIG. 6G and at stage 610-10, the model selection component may remove, from the model selection list, a second model selection element that includes a highest number of recognized object(s) in the model selection list. For example, the model selection component may remove, from the model selection list 620, a second model selection element that includes a highest number of recognized object(s) in the model selection list in a similar manner as discussed at stage 610-4. Thus, as illustrated in FIG. 6G and at stage 610-10, the model selection component 312 may remove a second model selection element from the model selection list 620, where second model selection element includes the object recognition model identifier 412-3.

Figure 6H:
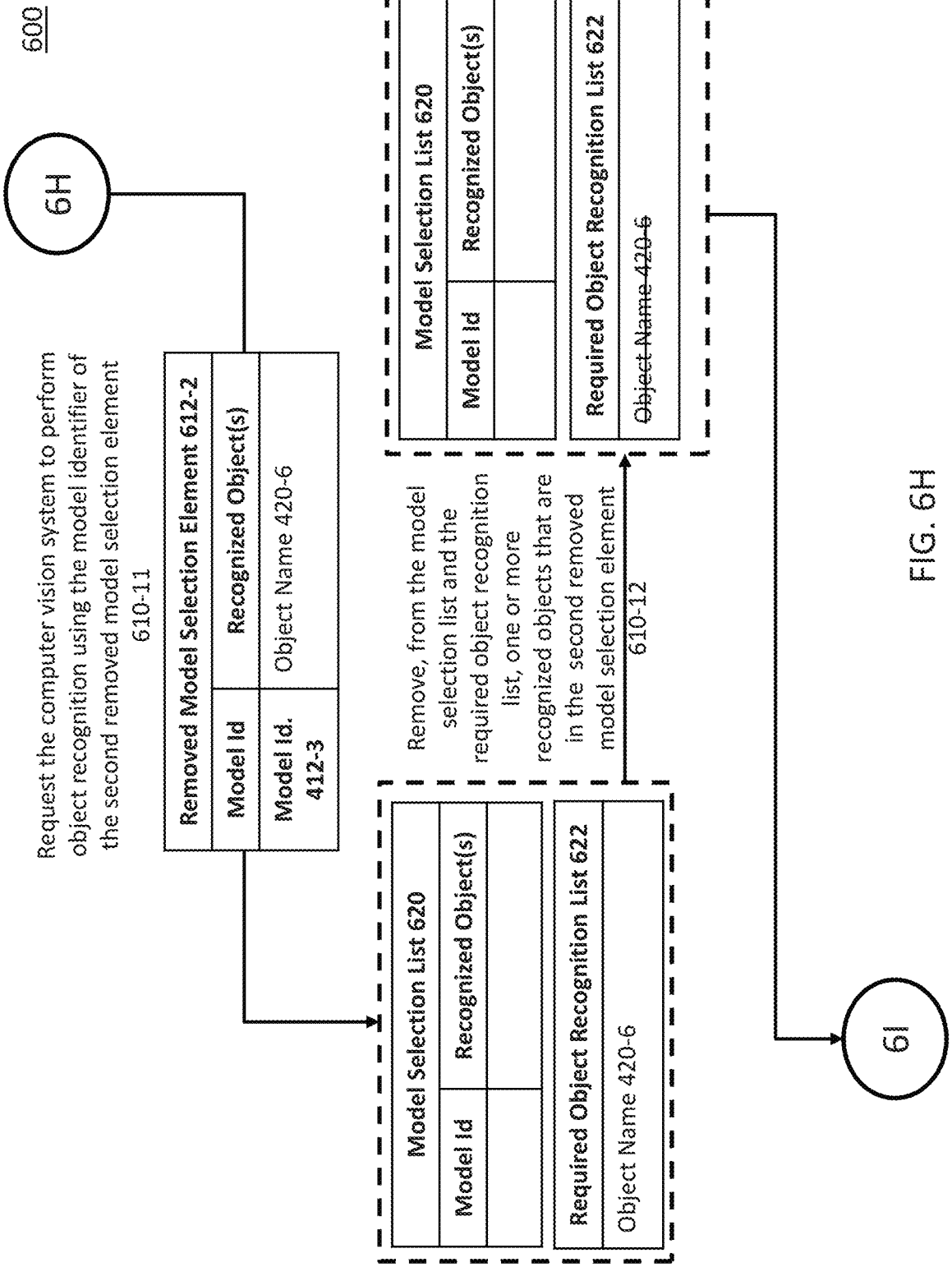
Figure 6I:
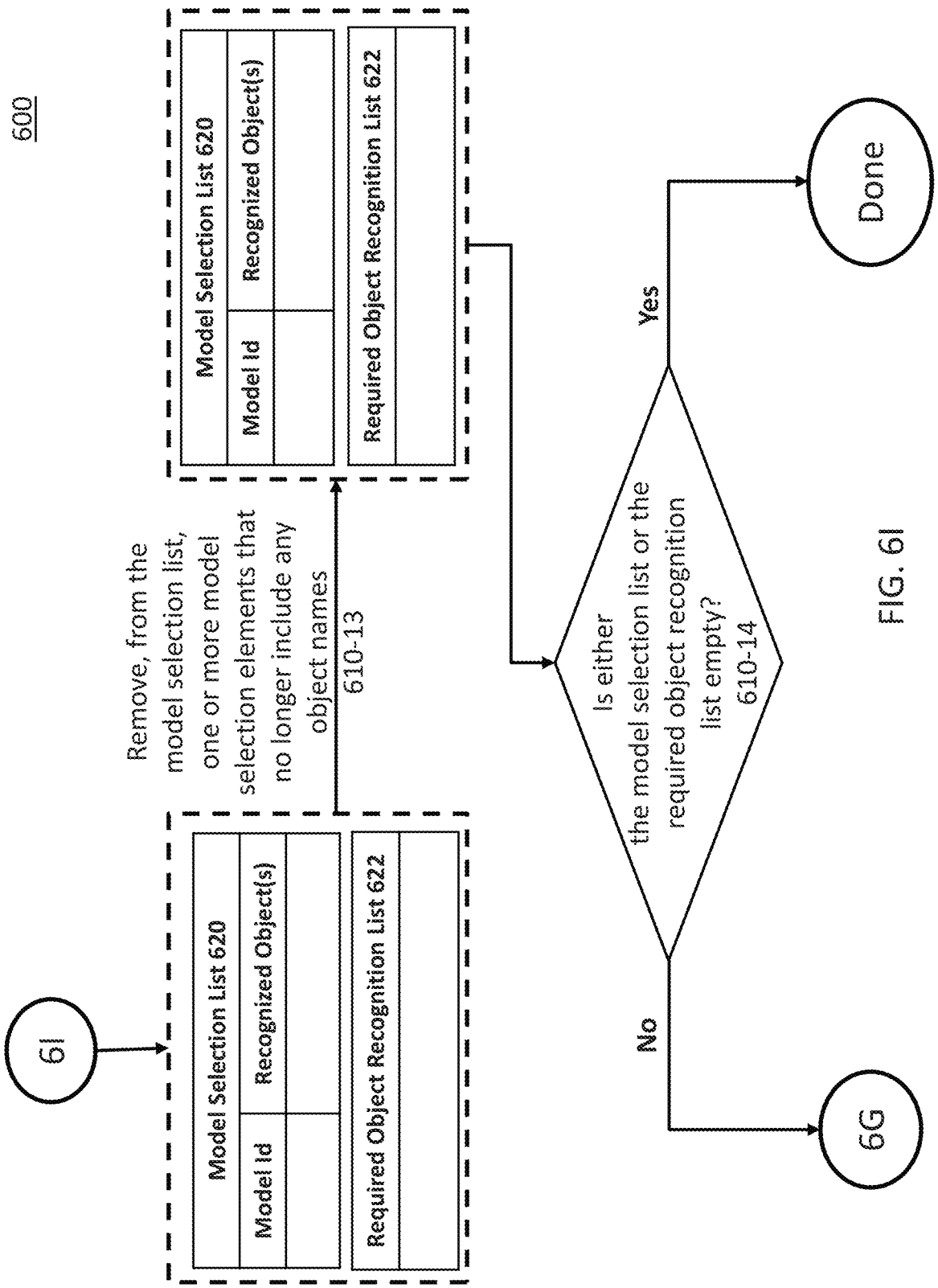

As illustrated in FIG. 6H and at stage 610-11, the computer vision interface component 314 may request the computer vision system to perform object recognition using a model identifier of the second removed model selection element. For example, the computer vision interface component 314 may request the computer vision system 130 to perform object recognition on the audit image for the compliance audit using an object recognition model that is identified by the object recognition model identifier 412-3 of the second removed model selection element in a similar manner as discussed at stage 610-5.

Although not illustrated in FIG. 6H, it is to be appreciated that upon receipt of the request, computer vision system 130 may then apply an object recognition model having the object recognition model identifier 412-3 to the audit image, and generate second recognized object information. The computer vision system 130 may then transmit the generated second recognized object information to the computer vision interface component 314 where the second recognized object information may be temporarily cached or stored until a minimum set of object recognition models have been applied and audit result information has been generated based at least on all the received recognized object information.

Also illustrated in FIG. 6H and at stage 610-12, the model selection component 312 may remove, from the model selection list and the required object recognition list, one or more recognized objects that are in the second removed model selection element. For example, the model selection component 312 may remove, from one or more model selection elements of the model selection list 620, object name 420-6, which is the second removed model selection element 612-2. However, because the model selection list 620 is now empty, no object names can be removed from it. Similarly, the model selection component 312 may remove, from the required object recognition list 622, object name 420-6 from the required object recognition list 622.

As illustrated in FIG. 6H and at stage 610-13, the model selection component 312 may remove, from the model selection list, one or more model selection elements that no longer include any object names. For example, the model selection component 312 may remove, from the model selection list 620, one or more model selection elements that no longer include any object names. However, because the model selection list 620 is now empty, stage 610-13 may be optional because no model selection elements can be removed from it.

Also illustrated in FIG. 6H and at stage 610-14, the model selection component 312 may determine whether either the model selection list or the required object recognition list empty. For example, the model selection component 312 may determine whether the model selection list 620 no longer contains any model selection elements in a similar manner as discussed at stage 610-8. Similarly, the model selection component 312 may also determine whether required object recognition list no longer contains any object names in a similar manner as discussed at stage 610-8. If the answer to either inquiry is "Yes" then the second method of selecting a minimum set of object recognition models to recognize all object names within the required object recognition list 510 has completed, which is the case here because both list are now empty. If the answer to both inquiry is "No," then the method continues to back to FIG. 6G and is repeated until either the model selection list 620 or the required object recognition list 622 is empty.

It is to be appreciated that unlike the iterative method of FIG. 5, the non-iterative method discussed above with respect to FIGS. 6A-6I has substantially greater efficiency, particularly when the number of object recognition models and the number of recognized objects corresponding to each object recognition model are large. Indeed, unlike the iterative method which has an exponential space complexity, the non-iterative method would have a space complexity of O $(n^2(\log_2 m+1 \log_2 n))$ where m is the number of object names corresponding to each object recognition model identifier and n is the total number of object recognition model identifiers.

It is to be further appreciated that by using the non-iterative method discussed above with respect to FIGS. 6A-6I, the distributed compliance system 126 may also be able to quickly identify object recognition models and further reduce the time required to provide audit result information after an audit image is received for object recognition.

FIGS. 7A-7D illustrate example UI views 700 of the mobile compliance application for performing an example compliance audit in the example retail store that uses a minimum set of object recognition models to locate and identify one or more products in an audit image.

Figure 7B:
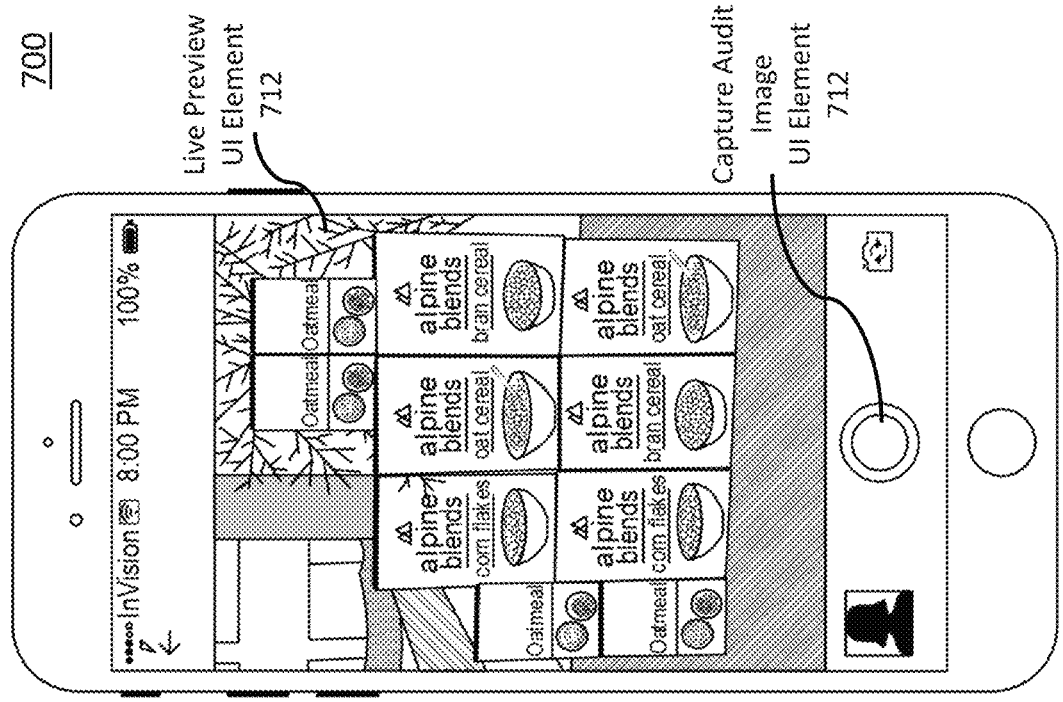
Figure 7A:
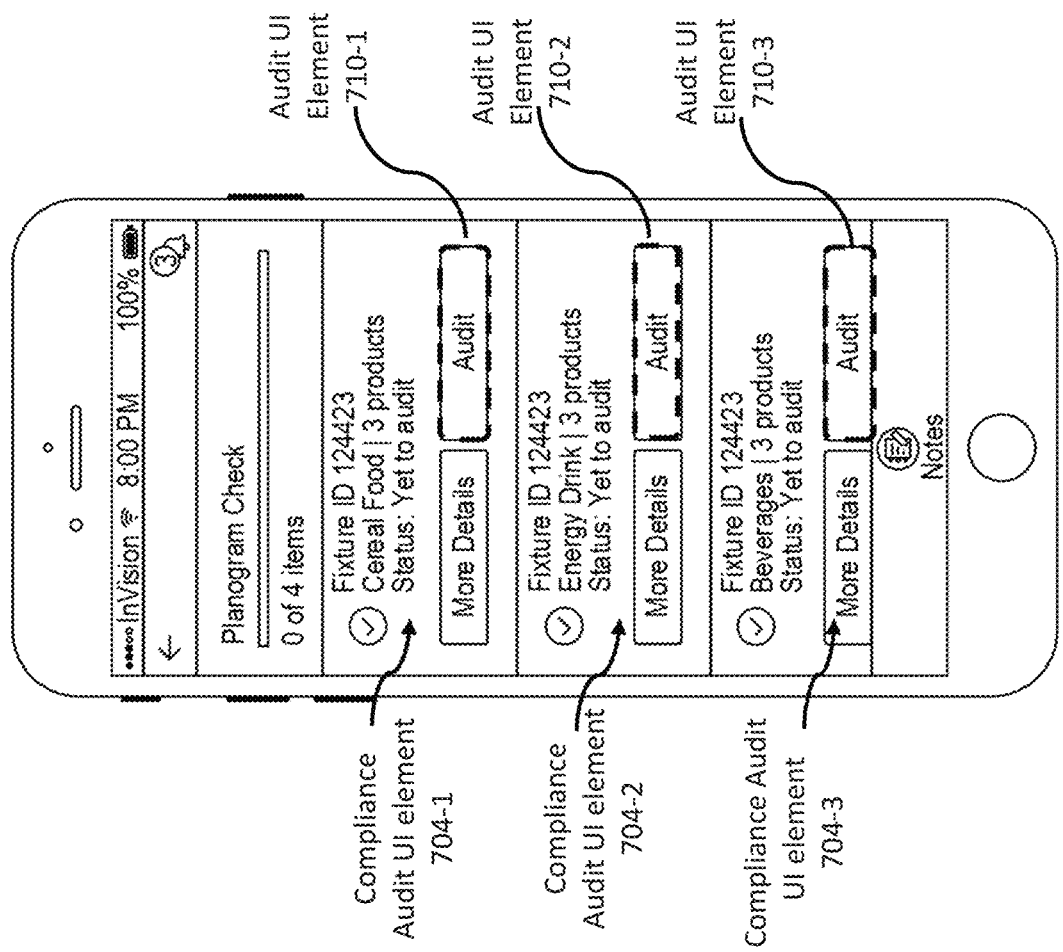

As illustrated in FIG. 7A, the mobile compliance application 112 may visually present one or more compliance audit UI elements 704-1, 704-2, 704-3 that enable a user of the mobile device 102 (e.g., an auditor, sales representative, merchandiser, etc.) to audit its compliance of one or more planograms at a physical location. As illustrated in FIG. 7A, each compliance audit UI element 704-1, 704-2, 704-3 may further include, without limitation, at least an audit UI element 710-1, 710-2, 710-3, respectively. The user may then select, via the touch sensitive display component 286 of its mobile device 102, an audit UT element (e.g., audit UI element 510-1 for "Cereal Food|3 products," etc.) to view additional compliance audit information for a particular compliance audit. Moreover, after the user selects an audit UT element (e.g., audit UI element 510-1 for "Cereal Food|3 products," etc.), the mobile compliance application 112 may visually present, on the touch sensitive display component 286, a live preview UI element 512.

As illustrated in FIG. 7B, the live preview UI element 712 may visually present streamed digital image information captured by a CCD image sensor of the image acquisition component 294 at a specific frame rate (e.g., 30 frames per second, 60 frames per second, etc.) for visual presentation on the display of the mobile device 102 at substantially the same or different frame rate. The user may then physically move his or her mobile device 102 and consequently, also physically move the image acquisition component 294 of the mobile device to capture an image of, for example, planogram associated with the particular compliance audit. To capture an audit image for the selected compliance audit, the user may select the capture audit image UI element 712, which may be stored in the device datastore 250.

As illustrated in FIG. 7C, after the user selects capture audit image UI element 712 to capture an audit image, the audit image is then displayed in the audit image UI element 714. The user may then select the use audit image UI element 716 to transmit the captured audit image stored in the device datastore 250 to the distributed compliance system 126 via the mobile compliance backend system 120 and compliance API gateway 122. In response, the distributed compliance system 126 (e.g., compliance audit object recognition application 140, etc.) may request the computer vision system 130 to recognize one or more products within the audit image using at least the example embodiments discussed with respect to FIG. 5, FIGS. 6A-6I, FIG. 8, and FIGS. 9A-8B. Additionally, the mobile compliance application 112 may also receive audit result information for a particular compliance audit (e.g., compliance audit associated with compliance audit UI element 304-1 for "Cereal Food|3 products," etc.) from the distributed compliance system 126 (e.g., compliance audit object recognition application 140, etc.) via mobile compliance backend system 120 and compliance API gateway 122.

As illustrated in the FIG. 7D, after receiving the audit result information for a particular compliance audit (e.g., compliance audit associated with compliance audit UI element 704-1 for "Cereal Food|3 products," etc.), at least a portion of the audit result information and reference product information for each reference product in a particular audit may be visually presented in one or more recognized object tag UI elements 720-1, 722-1, 718-1, and 718-2 and visually presented in the product performance overview UI element 730.

In one embodiment, the audit result information may include, without limitation, a set of recognized objects (e.g., cereal products such as "Bran Cereal," "Corn Flakes," "Oat Cereal," etc.), where each object is represented as recognized object information. For example, and as illustrated in FIG. 7D, the recognized object information for each recognized object may include, without limitation, at least one recognized object tag that identifies a rectangular region of a recognized object within the audit image. As such, the recognized object tag UI element 720-1 (e.g., recognized object with recognized object name of "Corn Flakes"), the recognized product tag UI element 722-1 (e.g., recognized object with recognized object name of "Bran Cereal"), and the recognized object tag UI elements 718-1, 718-2 (e.g., recognized object with recognized object name of "Oat Cereal") may all be visually presented as recognized object tags.

In one embodiment, each the recognized object tag may include, without limitation, at least a minimum X coordinate and a minimum Y coordinate (e.g., upper left corner) and a maximum X coordinate and maximum Y coordinate (e.g., lower right corner) defining at least two diagonal corners (e.g., upper left and lower right corners, etc.) of a rectangular overlay region of where the recognized object is located within the audit image. It is to be appreciated that while the rectangular overlay regions are illustrated or outlined in a specific color (e.g., white, etc.), other colors may be used, and may vary for each recognized object.

Also, illustrated in the FIG. 7D, the product performance overview UI element 730 may visually present at least a portion of the reference product information for each reference product in a set of reference products that are expected to be within a visual marketing campaign (e.g., planogram) associated with a particular compliance audit. For example, as illustrated in FIG. 7D, the product performance overview UI element 730 may visually present reference product images (e.g., yellow box labeled "Bran Cereal," green box labeled "Corn Flakes," blue box labeled "Oat Cereal," etc.) and corresponding reference product name that are expected to be within a particular planogram associated with a particular compliance audit.

In one embodiment, the product performance overview UI element 730 may further visually present at least a portion of audit result information for each reference product. The audit result information may include a recognized object facing count and a reference product facing count for each reference product. For example, with respect to reference product "Bran Cereal," the product performance overview UI element 730 may visually present "1 out of 2" to indicate that one facing of the "Bran Cereal" reference product was recognized by the computer vision system 130 out of two facings of the "Bran Cereal" reference product was expected and so forth.

Figure 8:
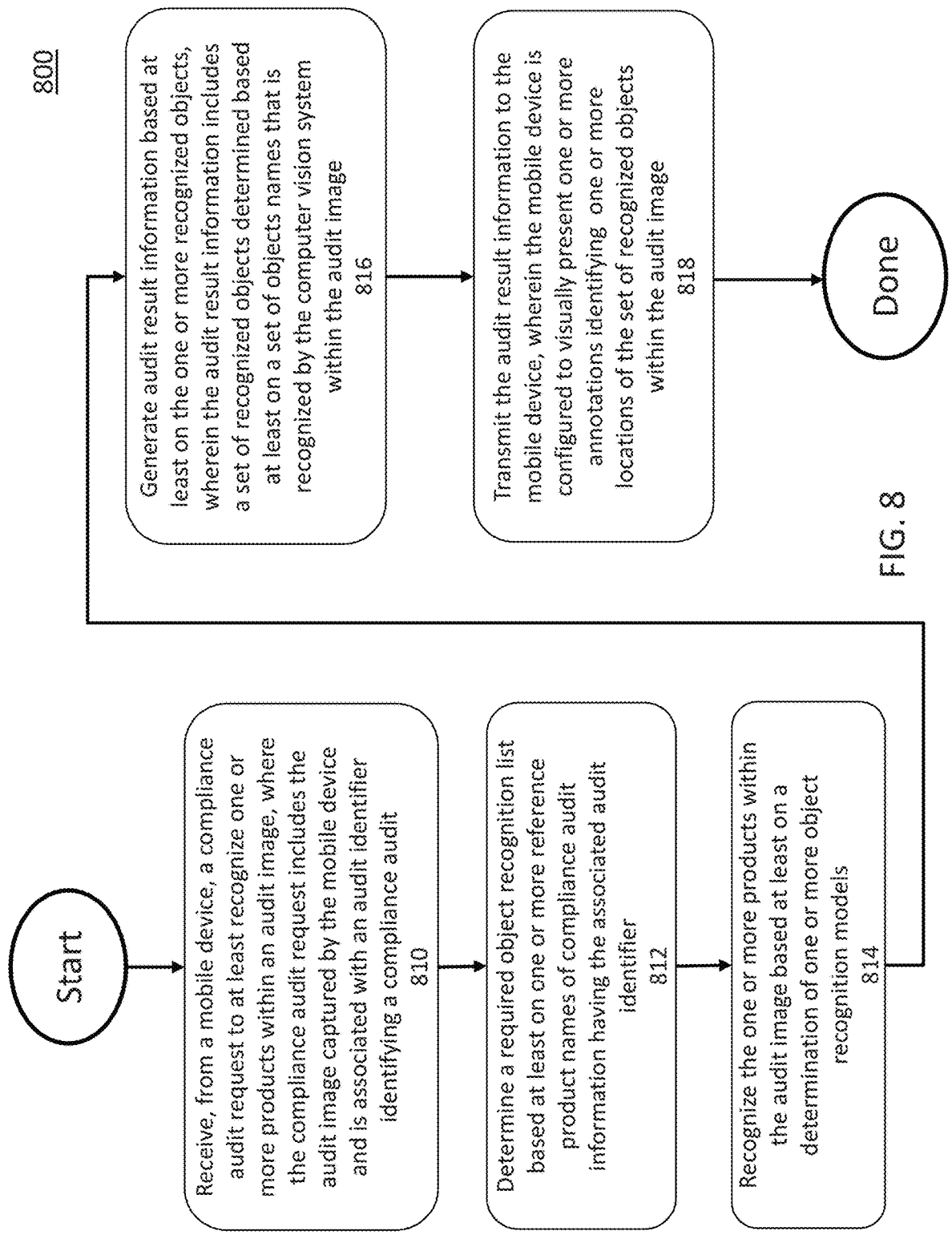
FIG. 8 illustrates an example logic flow for an example compliance audit relying on a minimum set of object recognition models to locate and identify one or more products in an audit image.

FIG. 8 illustrates an example logic flow 800 for an example compliance audit relying on a minimum set of object recognition models to locate and identify one or more products in an audit image. It is to be appreciated that depending on implementation, not all stages need to be performed. Nor do all stages need to be performed in the order as illustrated.

At stage 810, the distributed compliance system 126 may receive, from a mobile device 102, a compliance audit request to at least recognize one or more products within an audit image, wherein the compliance audit request includes the audit image captured by the mobile device 102 and is associated with an audit identifier identifying a compliance audit. The compliance audit request may be transmitted from the mobile device 102 as discussed with respect to FIGS. 7A-7D.

At stage 812, the distributed compliance system 126 (e.g., compliance audit object recognition application 140, etc.) may determine a required object recognition list (e.g., required object recognition list 510, etc.) based at least on one or more reference product names of compliance audit information having the associated audit identifier.

At stage 814, the distributed compliance system 126 (e.g., Compliance Audit Object Recognition Application 140 in combination with computer vision system 130, etc.), may recognize the one or more products within the audit image based at least on a determination of one or more object recognition models using the methods discussed with respect to FIGS. 5, 6A-6I, and 9A-9B.

At stage 816, the distributed compliance system 126 (e.g., the compliance audit object recognition application 140, etc.) may generate audit result information based at least on the one or more recognized objects, wherein the audit result information includes a set of recognized objects determined based at least on a set of objects names that is recognized by the computer vision system within the audit image.

At stage 818, the distributed compliance system 126, may transmit the audit result information to the mobile device, wherein the mobile device is configured to visually present one or more annotations identifying one or more locations of the set of recognized objects within the audit image.

Figure 9A:
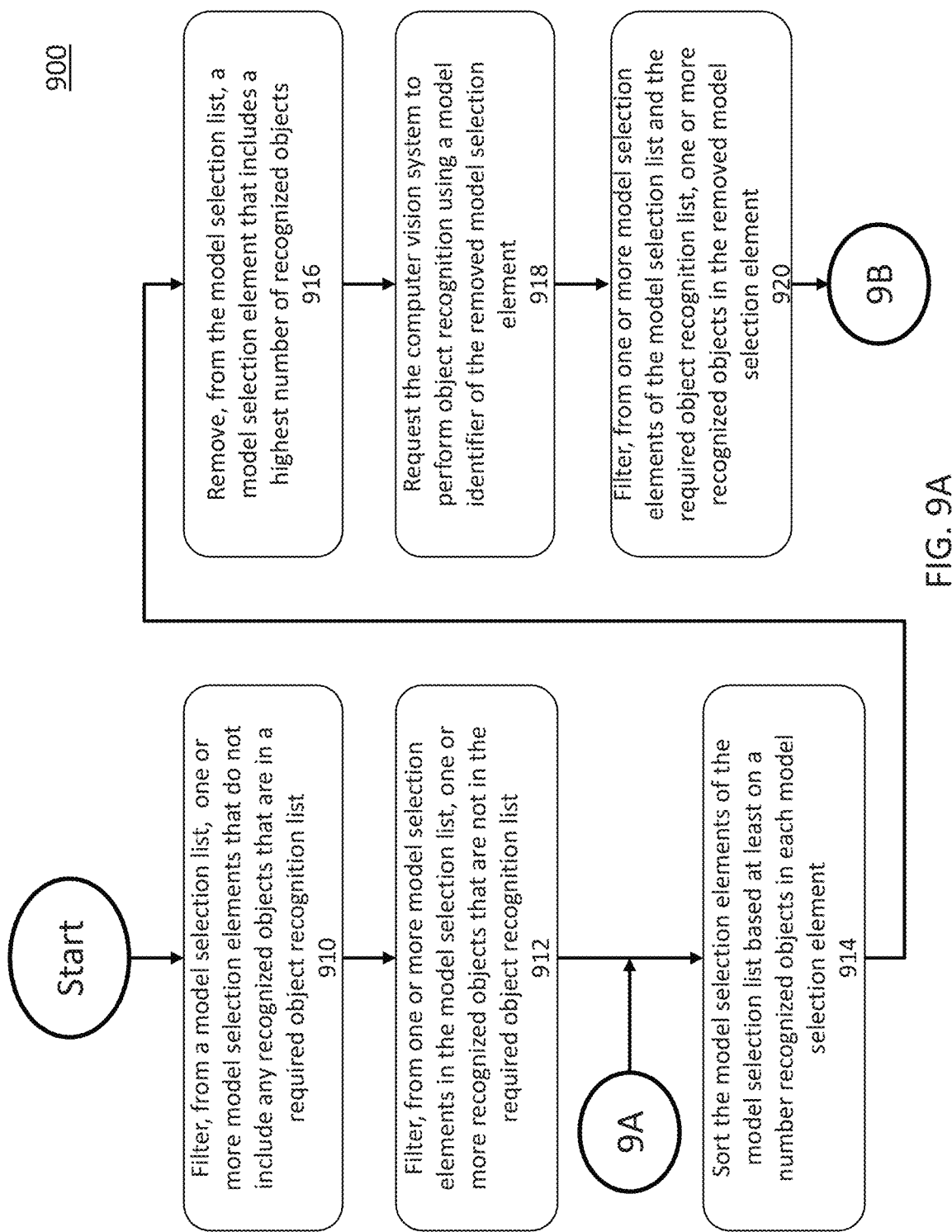
FIGS. 9A-9B illustrate another example logic flow of the second method for selecting and applying a minimum set of object recognition models for computer vision.
Figure 9B:
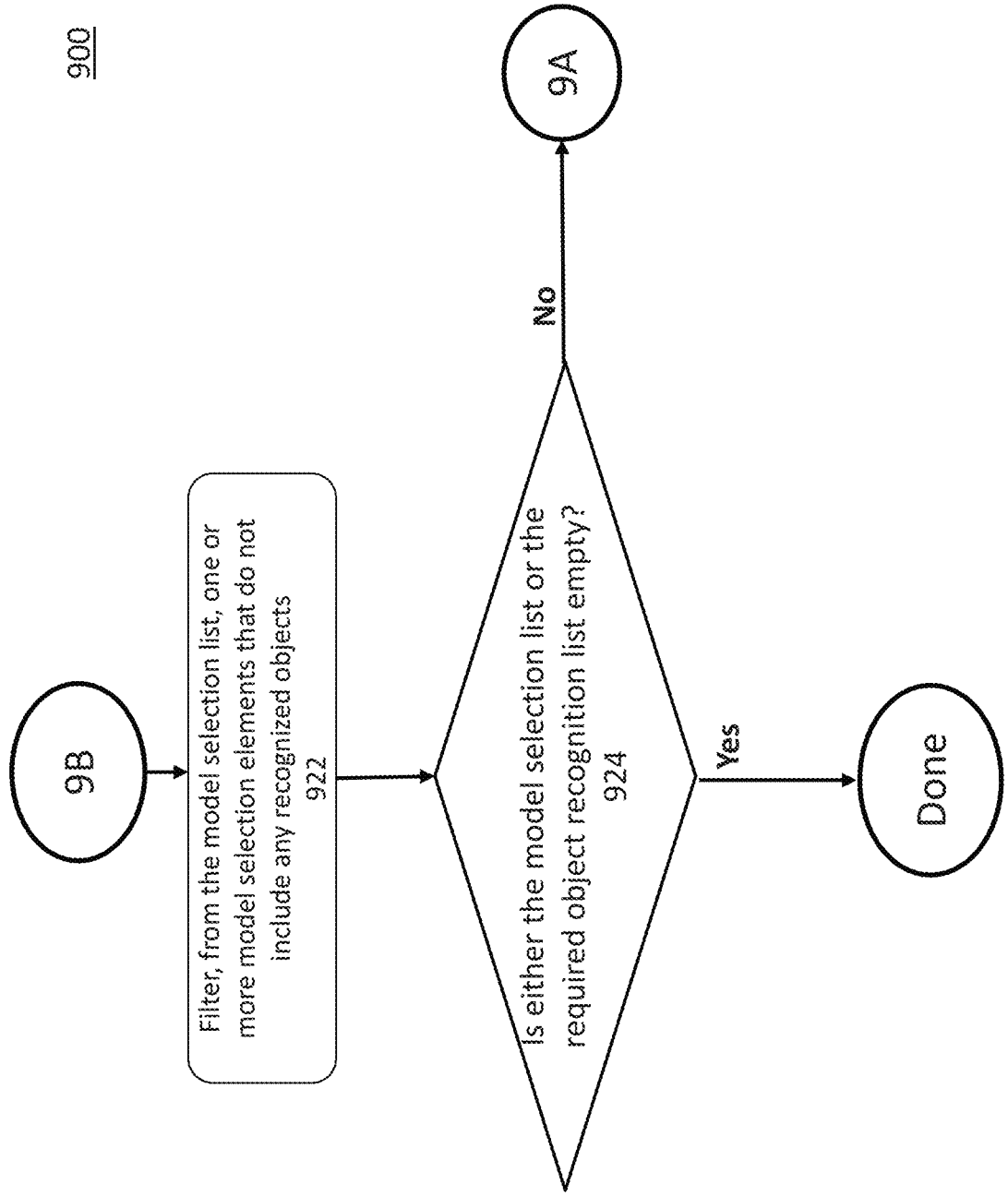

FIGS. 9A-9B illustrate another example logic flow 900 of the second method for selecting and applying a minimum set of object recognition models for computer vision. It is to be appreciated that depending on implementation, not all stages need to be performed. Nor do all stages need to be performed in the order as illustrated. Although not explicitly illustrated in FIG. 9A-9B, it is to be further appreciated that prior to performing the stages discussed in FIGS. 9A-9B, the model selection component 312 may begin by creating a local or mutable copy of the required object recognition list (e.g., required object recognition list 510, etc.) previously generated by the compliance audit object recognition application 140. Additionally the model selection component 312 may also create a local or mutable copy of the previously determined object recognition model list 410.

As illustrated in FIG. 9A and at stage 910, the distributed compliance system 126 (e.g., the model selection component 312, etc.) may filter, from a model selection list (e.g., model selection list 620, etc.), one or more model selection elements that do not include any recognized objects (e.g., object names 420-2, 420-4, 420-6, etc.) that are in a required object recognition list (e.g., required object recognition list 622, etc.).

As illustrated in FIG. 9A and at stage 912, the distributed compliance system 126 (e.g., the model selection component 312, etc.) may filter, from one or more model selection elements in the model selection list (e.g., model selection list 620, etc.), one or more recognized objects (e.g., object names 420-1, 420-3, 420-5, etc.) that are not in the required object recognition list (e.g., required object recognition list 622, etc.).

As illustrated in FIG. 9A and at stage 914, the distributed compliance system 126 (e.g., the model selection component 312, etc.) may sort the model selection elements of the model selection list (e.g., model selection list 620, etc.) based at least on a number recognized objects in each model selection element.

As illustrated in FIG. 9A and at stage 916, the distributed compliance system 126 (e.g., the model selection component 312, etc.) may remove, from the model selection list (e.g., model selection list 620, etc.), a model selection element that includes a highest number of recognized objects (e.g., model selection element having the object recognition model identifier 412-2 as illustrated in FIG. 6D, etc.)

As illustrated in FIG. 9A and at stage 918 the distributed compliance system 126 (e.g., computer vision interface component 314, etc.) may request the computer vision system 130 to perform object recognition using a model identifier (e.g., object recognition model identifier 412-2 as illustrated in FIG. 6D, etc.) of the removed model selection element (e.g., removed model selection element 612-1, etc.)

As illustrated in FIG. 9A and at stage 920, the distributed compliance system 126 (e.g., the model selection component 312, etc.) may filter, from one or more model selection elements of the model selection list (e.g., model selection list 620, etc.) and the required object recognition list (e.g., required object recognition list 622, etc.), one or more recognized objects (e.g., object names 420-2, 422-4, etc.) in the removed model selection element (e.g., removed model selection element 612-1, etc.).

As illustrated in FIG. 9B and at stage 922, the distributed compliance system 126 (e.g., the model selection component 312, etc.) may filter, from the model selection list (e.g., model selection list 620, etc.), one or more model selection elements that do not include any recognized objects (e.g., model selection element having object recognition model identifier 412-1 as illustrated in FIG. 6F, etc.).

As illustrated in FIG. 9B and at stage 924, the distributed compliance system 126 (e.g., the model selection component 312, etc.) may determine whether either the model selection list (e.g., model selection list 620, etc.) or the required object recognition list (e.g., required object recognition list 622, etc.) is empty. If answer is "No" to both inquiries, then the distributed compliance system 126 (e.g., the model selection component 312, etc.) may repeat stages 914-924 of FIGS. 9A-9B (e.g., stages 610-9-610-14 of FIG. 6G-6I). If answer is "Yes" to either or both inquiries, then second method for selecting and applying a minimum set of object recognition models for computer vision is complete.

Figure 10:
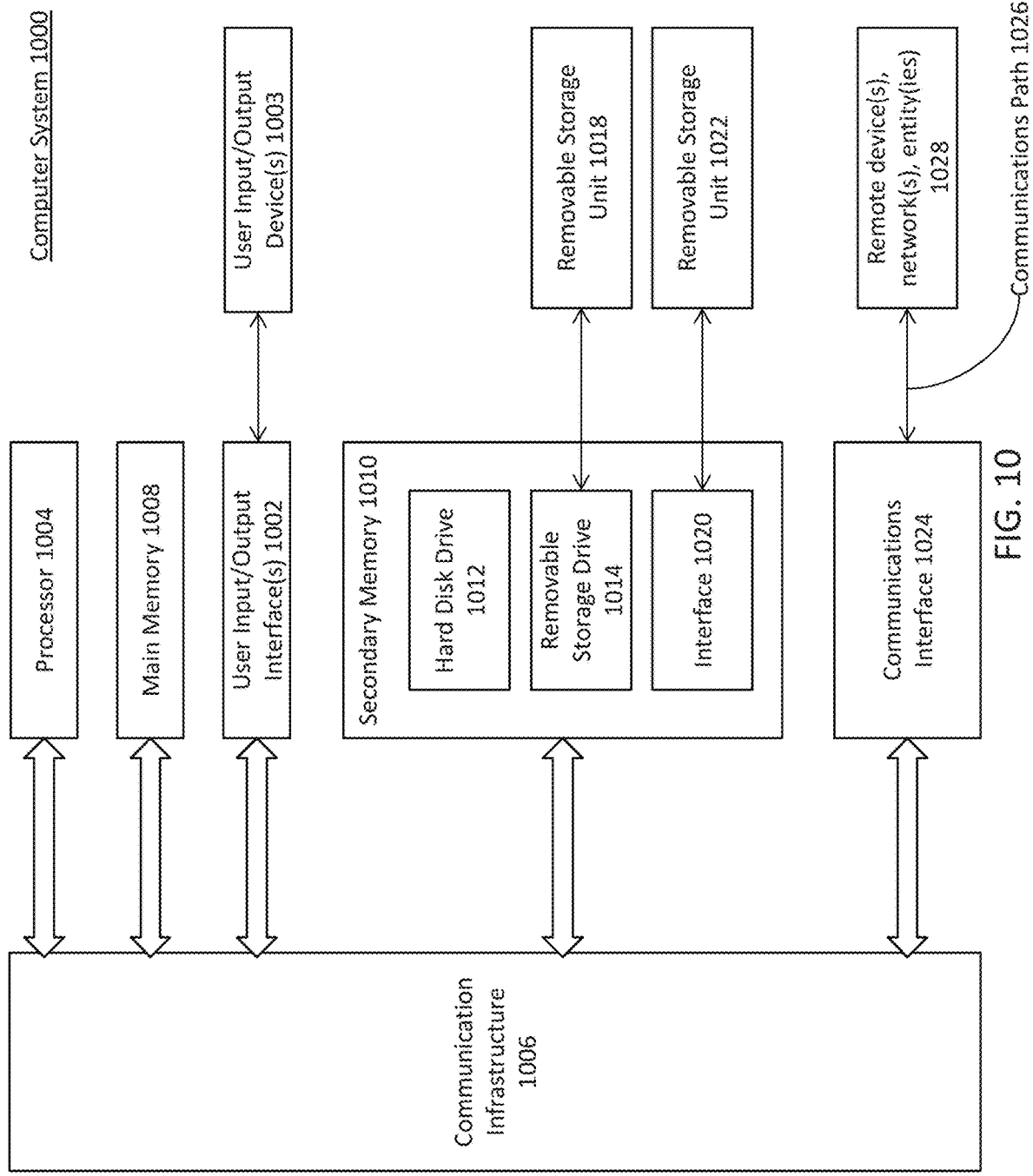
FIG. 10 illustrates an example computer system useful for implementing various embodiments.

Various embodiments may be implemented, for example, using one or more well-known computer systems, such as computer system 1000 shown in FIG. 10. One or more computer systems 1000 may be used, for example, to implement any of the embodiments discussed herein, as well as combinations and sub-combinations thereof. For example, the computer system 1000 may implement the computing device 104. In another example, one or more computing systems 1000 may be communicatively coupled to each other, where each is configured to execute one or more virtual machines (not shown). The one or more virtual machines may be managed or otherwise orchestrated by one or more virtual machine managers (not shown) configured to provision and/or configure one or more virtual machines to the one or more computing systems 1000. The one or more virtual machines may be further configured as a Software as a Service (SaaS), Platform as a Service (PaaS) and/or an Infrastructure as a Service (IaaS) provider configured to host or otherwise execute one or more applications associated with one or more gateways, systems, and/or datastores of FIG. 1.

Computer system 1000 may include one or more processors (also called central processing units, or CPUs), such as a processor 1004. Processor 1004 may be connected to a communication infrastructure or bus 1006.

Computer system 1000 may also include customer input/output device(s) 1003, such as monitors, keyboards, pointing devices, etc., which may communicate with communication infrastructure or bus 1006 through customer input/output interface(s) 1002.

One or more of processors 1004 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 may also include a main or primary memory 1008, such as random access memory (RAM). Main memory 1008 may include one or more levels of cache. Main memory 1008 may have stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 may read from and/or write to removable storage unit 1018.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system 1000 to communicate with external or remote devices 1028 over communications path 1026, which may be wired and/or wireless (or a combination thereof), and which may include any combination of LANs, WANs, the Internet, etc. Control logic and/or data may be transmitted to and from computer system 1000 via communication path 1026.

Computer system 1000 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1000 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. At least one server device, comprising:
a memory configured to store operations; and
one or more processors configured to perform the operations, the operations comprising:
  receiving, from a mobile device, a compliance audit request to at least recognize one or more products within an audit image, wherein the compliance audit request includes the audit image captured by the mobile device and is associated with an audit identifier identifying a compliance audit;
  selecting a first object recognition model having a first associated object recognition model identifier from a model selection list based at least on a required object recognition list, wherein the first object recognition model is configured to recognize a first set of object names within the required object recognition list;
  requesting a computer vision system to perform object recognition using the first object recognition model to recognize the first set of object names within the audit image; and
  transmitting audit result information to the mobile device, wherein the audit result information includes a set of recognized objects determined based at least on a first set of objects names that is recognized by the computer vision system within the audit image, wherein:
    each recognized object of the set of recognized objects is represented as recognized object information, and
    the recognized object information includes at least one recognized object tag that identifies at least one region of a recognized object within the audit image.

2. The at least one server device of claim 1, wherein the operations further comprise:
determining the required object recognition list based at least on one or more reference product names of compliance audit information having the associated audit identifier, wherein the required object recognition list includes at least one object name identifying at least one product to be recognized within the audit image; and
generating at least a portion of the audit result information before transmitting the audit result information to the mobile device, wherein the mobile device is configured to visually present one or more annotations identifying one or more locations of the set of recognized objects within the audit image.

3. The at least one server device of claim 2, wherein the operation for selecting the first object recognition model further comprises:
filtering, from the model selection list, two or more model selection elements that do not include any recognized objects that are in the required object recognition list; and
filtering, from the two or more model selection elements in the model selection list, one or more recognized objects that are not in the required object recognition list.

4. The at least one server device of claim 3, wherein the operation for selecting the first object recognition model further comprises:
sorting the two or more model selection elements of the model selection list based at least on a number of recognized objects in each model selection element; and
removing, from the model selection list, a model selection element that includes a highest number of recognized objects among all model selection elements in the model selection list.

5. The at least one server device of claim 4, wherein the operations further comprise:
filtering, from the two or more model selection elements in the model selection list and from the required object recognition list, one or more recognized objects that are in the removed model selection element; and
filtering, from the model selection list, at least one model selection element that does not include any recognized objects.

6. The at least one server device of claim 5, wherein the operations further comprise:
determining that neither the model selection list nor the required object recognition list is empty; and
selecting a second object recognition model having a second object recognition model identifier from the model selection list based at least on the required object recognition list.

7. The at least one server device of claim 6, wherein:
the second object recognition model is configured to recognize a second set of object names in the required object recognition list, and
the second set of object names includes at least one object name that is not within the first set of object names in the required object recognition list.

8. The at least one server device of claim 1, wherein:
the recognized object tag includes at least a minimum X coordinate and a minimum Y coordinate and a maximum X coordinate and maximum Y coordinate defining at least two corners of a rectangular region of where the recognized object is located within the audit image.

9. The at least one server device of claim 8, wherein:
the recognized object information includes a recognized object name identifying a name of the recognized object, a recognized object unique identifier that uniquely identifies the recognized object, a recognized object placement description that identifies a placement location of the recognized object and a number of facings at that placement location, a recognized object facing count that indicates a number of facings for a recognized object within the audit image, a recognized object share of shelf that identifies a percentage of the recognized object facing count as compared to all available facings within a reference image of the compliance audit information.

10. The at least one server device of claim 2, wherein:
the audit image is a digital image captured by an image capture component of the mobile device, and
the audit image includes one or more physical products for sale as arranged at a physical location from a viewpoint captured by the image capture component.

11. The at least one server device of claim 2, wherein the operations further comprise:
validating the audit image for compliance with an image format and image size associated with the computer vision system configured to recognize one or more objects within the audit image before requesting the computer vision system to perform the object recognition using the first object recognition model.

12. The at least one server device of claim 11, wherein the operation for requesting the computer vision system to perform object recognition using the first object recognition model further comprises:
transmitting, to the computer vision system, an object recognition request to recognize one or more objects within the audit image by using an object recognition model identified by the object recognition model identifier, wherein the object recognition request includes the audit image information representative of the audit image and a first object recognition model identifier that identifies the first object recognition model and; and
receiving, from the computer vision system, an object recognition response, wherein the object recognition response includes the first object recognition model identifier and at least a portion of the recognized object information for a recognized object within the audit image.

13. A computer implemented method, comprising:
receiving, from a mobile device, a compliance audit request to at least recognize one or more products within an audit image, wherein the compliance audit request includes the audit image captured by the mobile device and is associated with an audit identifier identifying a compliance audit;
selecting a first object recognition model having a first associated object recognition model identifier from a model selection list based at least on a required object recognition list, wherein the first object recognition model is configured to recognize a first set of object names within the required object recognition list;
requesting a computer vision system to perform object recognition using the first object recognition model to recognize the first set of object names within the audit image; and
transmitting audit result information to the mobile device, wherein the audit result information includes a set of recognized objects determined based at least on a first set of objects names that is recognized by the computer vision system within the audit image, wherein:
each recognized object of the set of recognized objects is represented as recognized object information, and
the recognized object information includes at least one recognized object tag that identifies at least one region of a recognized object within the audit image.

14. The computer implemented method of claim 13, further comprising:
determining the required object recognition list based at least on one or more reference product names of compliance audit information having the associated audit identifier, wherein the required object recognition list includes at least one object name identifying at least one product to be recognized within the audit image; and
generating at least a portion of the audit result information before transmitting the audit result information to the mobile device, wherein the mobile device is configured to visually present one or more annotations identifying one or more locations of the set of recognized objects within the audit image.

15. The computer implemented method of claim 14, wherein the selecting of the first object recognition model further comprises:
filtering, from the model selection list, two or more model selection elements that do not include any recognized objects that are in the required object recognition list; and
filtering, from the two or more model selection elements in the model selection list, one or more recognized objects that are not in the required object recognition list.

16. The computer implemented method of claim 15, wherein the selecting of the first object recognition model further comprises:
sorting the two or more model selection elements of the model selection list based at least on a number of recognized objects in each model selection element; and
removing, from the model selection list, a model selection element that includes a highest number of recognized objects among all model selection elements in the model selection list.

17. The computer implemented method of claim 16, further comprising:
filtering, from the two or more model selection elements in the model selection list and from the required object recognition list, one or more recognized objects that are in the removed model selection element; and
filtering, from the model selection list, at least one model selection element that does not include any recognized objects.

18. The computer implemented method of claim 17, further comprising:
   determining that neither the model selection list nor the required object recognition list is empty; and
   selecting a second object recognition model having a second object recognition model identifier from the model selection list based at least on the required object recognition list.

19. A computer readable storage device having instructions stored thereon, execution of which, by one or more processing devices, causes the one or more processing devices to perform operations comprising:
   receiving, from a mobile device, a compliance audit request to at least recognize one or more products within an audit image, wherein the compliance audit request includes the audit image captured by the mobile device and is associated with an audit identifier identifying a compliance audit;
   determining a required object recognition list based at least on one or more reference product names of compliance audit information having the associated audit identifier, wherein the required object recognition list includes at least one object name identifying at least one product to be recognized within the audit image;
   selecting a first object recognition model having a first associated object recognition model identifier from a model selection list based at least on the required object recognition list, wherein the first object recognition model is configured to recognize a first set of object names within the required object recognition list;
   requesting a computer vision system to perform object recognition using the first object recognition model to recognize the first set of object names within the audit image;
   generating at least a portion of audit result information, wherein the audit result information includes a set of recognized objects determined based at least on a first set of objects names that is recognized by the computer vision system within the audit image; and
   transmitting the audit result information to the mobile device, wherein the mobile device is configured to visually present one or more annotations identifying one or more locations of the set of recognized objects within the audit image, wherein
      each recognized object of the set of recognized objects is represented as recognized object information, and
      the recognized object information includes at least one recognized object tag that identifies at least one region of a recognized object within the audit image.

20. The computer readable storage device of claim 19, wherein the operation to select a first object recognition model further comprises:
   filtering, from the model selection list, two or more model selection elements that do not include recognized objects that are in the required object recognition list;
   filtering, from the two or more model selection elements in the model selection list, one or more recognized objects that are not in the required object recognition list;
   sorting the two or more model selection elements of the model selection list based at least on a number of recognized objects in each model selection element; and
   removing, from the model selection list, a model selection element that includes a highest number of recognized objects among all model selection elements in the model selection list.

* * * * *